(12) United States Patent
Li et al.

(10) Patent No.: US 12,307,070 B2
(45) Date of Patent: May 20, 2025

(54) MULTI-LEVEL MENU DISPLAY METHOD OF ELECTRONIC INTERACTIVE TABLET, AND ELECTRONIC INTERACTIVE TABLET

(71) Applicant: BOE Technology Group Co., Ltd., Beijing (CN)

(72) Inventors: Yingjie Li, Beijing (CN); Zhenyan Zhao, Beijing (CN); Pengyu Liu, Beijing (CN); Liping Lei, Beijing (CN); Jie Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/047,202

(22) Filed: Oct. 17, 2022

(65) Prior Publication Data

US 2023/0058247 A1    Feb. 23, 2023

Related U.S. Application Data

(63) Continuation-in-part of application No. PCT/CN2021/086009, filed on Apr. 8, 2021.

(30) Foreign Application Priority Data

May 22, 2020   (CN) .......................... 202010443611.9

(51) Int. Cl.
 *G06F 3/0488*  (2022.01)
 *G06F 3/0482*  (2013.01)
 (Continued)

(52) U.S. Cl.
 CPC ........ *G06F 3/0482* (2013.01); *G06F 3/04845* (2013.01); *G06F 3/04847* (2013.01); *G06F 3/04886* (2013.01); *G06F 2203/04804* (2013.01)

(58) Field of Classification Search
 None
 See application file for complete search history.

(56) References Cited

U.S. PATENT DOCUMENTS

2007/0220444 A1\*  9/2007  Sunday ................. G06F 3/0488
                                                  715/788
2010/0192102 A1   7/2010  Chmielewski et al.
(Continued)

FOREIGN PATENT DOCUMENTS

CN       101080068 A       11/2007
CN       102467326 A        5/2012
(Continued)

OTHER PUBLICATIONS

Screen captures from YouTube video clip entitled "Creating a table in Word," 7 pages, uploaded Nov. 10, 2017 by user "Skillsoft YouTube." Retrieved from the internet: https://www.youtube.com/watch?v=koDeGamrxV4 (Year: 2017).\*
(Continued)

*Primary Examiner* — Irete F Ehichioya
*Assistant Examiner* — Samuel Shen
(74) *Attorney, Agent, or Firm* — Workman Nydegger

(57) ABSTRACT

An electronic interactive tablet, a menu display method, and a writing tool attribute control method. When writing configuration needs to be performed when a user is using the electronic interactive tablet for writing, a writing configuration menu having multi-level menu options may be displayed, the writing configuration menu including multiple first-level menu options (M1-1 to M1-6) which are in one-to-one correspondence with one or more writing tools; the writing configuration menu has a regular shape, and the regular shape comprises a middle area and at least one annular area that surrounds the middle area; the at least one annular area is divided into multiple block-like sub-areas, the multiple block-like sub-areas display in one-to-one cor- (Continued)

respondence the multiple first-level menu options (M1-1 to M1-6); and the middle area is configured to display a secondary-level menu option (M2) of the first-level menu options.

16 Claims, 14 Drawing Sheets

(51) Int. Cl.
*G06F 3/04845* (2022.01)
*G06F 3/04847* (2022.01)
*G06F 3/04886* (2022.01)

(56) References Cited

U.S. PATENT DOCUMENTS

| | | | |
|---|---|---|---|
| 2012/0079427 A1 | 3/2012 | Carmichael et al. | |
| 2012/0124521 A1 | 5/2012 | Guo | |
| 2013/0019182 A1* | 1/2013 | Gil | G06F 3/0482 715/834 |
| 2013/0074003 A1* | 3/2013 | Dolenc | G06F 3/0485 715/781 |
| 2013/0212535 A1* | 8/2013 | Kim | G06F 3/04886 715/841 |
| 2013/0227433 A1 | 8/2013 | Doray et al. | |
| 2015/0205455 A1* | 7/2015 | Shaw | G06F 3/04842 715/834 |
| 2020/0356250 A1* | 11/2020 | Soli | G06F 3/03545 |
| 2022/0214784 A1* | 7/2022 | Varghese | G06F 3/04886 |
| 2023/0058247 A1 | 2/2023 | Li et al. | |
| 2023/0315282 A1* | 10/2023 | Yu | G06F 3/04886 345/156 |

FOREIGN PATENT DOCUMENTS

| | | |
|---|---|---|
| CN | 103649894 A | 3/2014 |
| CN | 104750367 A | 7/2015 |
| CN | 106415468 A | 2/2017 |
| CN | 106648330 A | 5/2017 |
| CN | 108958616 A | 12/2018 |
| CN | 111625158 A | 9/2020 |
| WO | 2012059596 A1 | 5/2012 |
| WO | 2019163390 A1 | 8/2019 |

OTHER PUBLICATIONS

International Search Report and Written Opinion, mailed Jul. 7, 2021, from PCT/CN2021/086009.
Chinese First Office Action, mailed Mar. 25, 2021, from Chinese App. No. 202010443611.9.
Chinese Second Office Action, mailed Oct. 9, 2021, from Chinese App. No. 202010443611.9.

* cited by examiner

A writing configuration menu is displayed on the touch display screen, where the writing configuration menu includes a plurality of first-level menu options which are in one-to-one correspondence with one or more writing tools ⟵ S101

Fig. 1

In response to a clicking operation from a user on a middle region, the next lower-level menu option of the first-level menu option corresponding to the selected block-shaped sub-region is displayed in the middle region ⟵ S201

In response to a double-clicking operation from the user on the middle region, the previous lower-level menu option of the first-level menu option corresponding to the selected block-shaped sub-region is displayed in the middle region ⟵ S202

Fig. 2

In response to a dragging operation from the user on a floating menu, the floating menu is moved according to a dragging trajectory corresponding to the dragging operation ⟵ S301

Fig. 3

In response to a calling operation from a user on a writing application navigation bar on one of four sides of a writing application, the writing configuration floating button is displayed on one side of the called writing application navigation bar ⟵ S401

Fig. 4

| A writing tool bar is displayed on a writing application, where the writing tool bar includes one or more writing tool icons; the one or more writing tool icons include at least one of an icon of a handwriting tool, an icon of a writing pen tool or an icon of an eraser tool; and the writing tool bar has an annular region | ⟵ S141 |

↓

| In response to a sliding operation from a user along an annular region, an attribute of a selected writing tool is changed, where the attribute of the writing tool includes at least one of a chirography thickness, chirography transparency, a chirography color, an erasing area or an erasing shape | ⟵ S142 |

Fig. 20

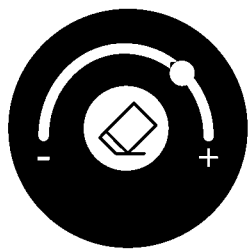

Fig. 21A

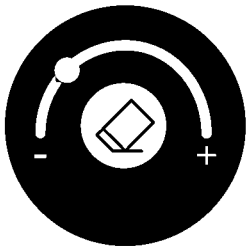

Fig. 21B

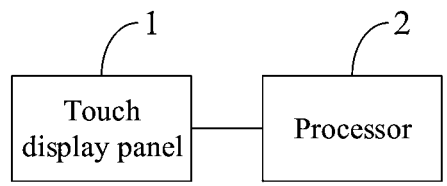

Fig. 22

MULTI-LEVEL MENU DISPLAY METHOD OF ELECTRONIC INTERACTIVE TABLET, AND ELECTRONIC INTERACTIVE TABLET

CROSS REFERENCE TO RELATED APPLICATIONS

The present disclosure is a continuation-in-part of International Application No. PCT/CN2021/086009, filed on Apr. 8, 2021, which claims priority to Chinese patent application No. 202010443611.9, filed on May 22, 2020 to the China Patent Office, and entitled "ELECTRONIC INTERACTIVE TABLET, MENU DISPLAY METHOD, AND WRITING TOOL ATTRIBUTE CONTROL METHOD", the entire content of which is incorporated herein by reference.

FIELD

The present application relates to the technical field of electronic interactive tablets, in particular to an electronic interactive tablet, a menu display method, and a writing tool attribute control method.

BACKGROUND

With the continuous development of technologies, interactive smart tablets are used in fields such as education and office work. A touch display screen of a touch interactive tablet may be touched by a hand and a writing pen. Touch by the writing pen relies on an infrared or electromagnetic induction module. Touch by the hand may rely on capacitive, resistive or infrared methods and the like.

SUMMARY

An embodiment of the present disclosure provides a menu display method of an electronic interactive tablet, where the electronic interactive tablet includes a touch display screen, and the menu display method includes:

displaying a writing configuration menu on the touch display screen, where the writing configuration menu includes a plurality of first-level menu options which are in one-to-one correspondence with a plurality of writing tools;

where the writing configuration menu has a regular shape, and the regular shape contains a middle region and at least one annular region surrounding the middle region; the at least one annular region includes a plurality of block-shaped sub-regions, and each of the plurality of block-shaped sub-regions displays one of the plurality of first-level menu options correspondingly; and the middle region is configured to display secondary-level menu options of the first-level menu options.

In some implementations, in the menu display method provided by the embodiment of the present disclosure, the outermost annular region is a first annular region, and the first annular region displays the plurality of first-level menu options;

in response to a calling operation from a user on the writing configuration menu of a writing application of the touch display screen, the plurality of first-level menu options are displayed in the first annular region, a selected function of one of the first-level menu options is started, and at the same time, the secondary-level menu option of the started first-level menu option is displayed in the middle region; or in response to a selecting operation from the user on one of the first-level menu options, the secondary-level menu option of the selected first-level menu option is displayed in the middle region.

In some implementations, the menu display method provided by the embodiment of the present disclosure further includes:

in response to a sliding operation from the user on the first annular region, controlling the first-level menu options that have been displayed to move along a sliding direction, newly displaying at least one first-level menu option in the first annular region, and concealing at least one of the first-level menu options that has been displayed at the same time; where the sliding direction of the sliding operation corresponds to an annular extending direction of the annular region.

In some implementations, in the menu display method provided by the embodiment of the present disclosure, specifically:

the first annular region is a ring or elliptical ring, the first-level menu options are arranged in the first annular region in sequence, and the block-shaped sub-regions are consistent in shape and size; and in response to a selecting operation that the user selects the first annular region and performs a clockwise or anti-clockwise operation, the first-level menu options that have been displayed are controlled to rotate clockwise or anti-clockwise along an edge of the first annular region, at least one first-level menu option is controlled to be newly displayed in the first annular region, and at least one of the first-level menu options that has been displayed is concealed at the same time.

In some implementations, in the menu display method provided by the embodiment of the present disclosure, specifically:

in response to a touch operation from the user on one first-level menu option in the first annular region, the first annular region is controlled to newly display one first-level menu option, and the first-level menu option subjected to the touch operation is concealed or deleted at the same time; where the touch operation is a deleting operation or a concealing operation; and the deleting operation or the concealing operation includes: an outward sliding operation relative to the middle region, or a continuous clicking operation.

In some implementations, in the menu display method provided by the embodiment of the present disclosure, at least one writing tool includes one or more attributes;

the secondary-level menu option of the first-level menu option corresponding to one writing tool is configured to display the one or more attributes; and when the current writing tool includes a plurality of attributes, the method further includes: in response to an operation from the user on the currently displayed writing tool attribute of the secondary-level menu option, switching the current writing tool attribute and displaying the switched writing tool attribute.

In some implementations, in the menu display method provided by the embodiment of the present disclosure, in response to a clicking or continuous clicking operation from the user on the currently displayed writing tool attribute of the secondary-level menu option, the current writing tool attribute is switched and the switched writing tool attribute is displayed.

In some implementations, in the menu display method provided by the embodiment of the present disclosure, types of the plurality of first-level menu options include one or more of an option of a handwriting tool, an option of a writing pen tool, an option of an eraser tool, an option of a file inserting tool, an option of a canvas dragging tool, an option of a revocation function and an option of a recovery function; and attributes of the writing pen tool include at least one of a width of a trajectory, transparency of the trajectory or a color of the trajectory; attributes of the handwriting tool include at least one of a width of a trajectory, transparency of the trajectory or a color of the trajectory; and a plurality of attributes of the eraser tool include at least one of an erasing area of an eraser or an erasing shape of the eraser.

In some implementations, in the menu display method provided by the embodiment of the present disclosure, the annular region adjacent to the middle region is a second annular region; and the method further includes: displaying, in the second annular region, an attribute progress bar matched with the displayed secondary-level menu option;

in response to a sliding or clicking operation of the user along the attribute progress bar corresponding to the erasing area of the eraser tool, enlarging or reducing a size of the erasing area of the eraser tool; and/or, in response to a sliding or clicking operation from the user along the attribute progress bar corresponding to the width of the trajectory of the writing pen tool or the handwriting tool, increasing or decreasing the width of the trajectory; and/or, in response to a sliding or clicking operation from the user along the attribute progress bar corresponding to the transparency of the trajectory of the writing pen tool or the handwriting tool, increasing or decreasing the transparency of the trajectory; and/or, in response to a sliding or clicking operation from the user along the attribute progress bar corresponding to the color of the trajectory of the writing pen tool or the handwriting tool, changing the color of the trajectory.

In some implementations, in the menu display method provided by the embodiment of the present disclosure, an option of the writing configuration menu is a floating menu; and the menu display method further includes: in response to a dragging operation from a user on the floating menu, moving the floating menu according to a dragging trajectory corresponding to the dragging operation.

In some implementations, the menu display method provided by the embodiment of the present disclosure further includes:

a writing configuration floating button, where the writing configuration floating button is a button for the writing configuration menu in a folded state, so that a region occupied by the writing configuration menu on the touch display screen is larger than a region occupied by the writing configuration floating button;

when displayed on the touch display screen, a writing application includes four sides corresponding to a periphery of the touch display screen; and in response to a calling operation from a user on a writing application navigation bar on one of the four sides of the writing application, the writing configuration floating button is displayed on one side of the called writing application navigation bar.

In some implementations, in the menu display method provided by the embodiment of the present disclosure, the calling operation from the user on the writing configuration menu of the writing application of the touch display screen is a selecting operation on the writing configuration floating button displayed by the writing application;

in response to the selecting operation from the user on the writing configuration floating button displayed by the writing application, the touch display screen does not display the writing configuration floating button but displays the writing configuration menu; and in response to a selecting operation from the user on a position other than the writing configuration menu displayed by the writing application on the touch display screen, the touch display screen does not display the writing configuration menu but displays the writing configuration floating button.

In some implementations, in the menu display method provided by the embodiment of the present disclosure, not displaying the writing configuration floating button but displaying the writing configuration menu in the touch display screen, specifically includes:

determining whether a relation between a position where the writing configuration floating button is located and a display edge of the writing application meets a condition for completely displaying the writing configuration menu;

if yes, displaying the writing configuration menu with the position where the writing configuration floating button is located as a center point of the writing configuration menu to be displayed; and if not, determining the center point of the writing configuration menu to be displayed and displaying the writing configuration menu; where the center point is a point to which a shortest distance from the writing configuration floating button is one half of a length of the writing configuration menu;

where not displaying the writing configuration menu but displaying the writing configuration floating button in the touch display screen, specifically includes:

recovering displaying of the writing configuration floating button with a position where the writing configuration menu is located as a center.

In some implementations, the menu display method provided by the embodiment of the present disclosure further includes:

in response to a sequentially continuous clicking operation from the user on the displayed option of the writing pen tool and the displayed option of the eraser tool, controlling a writing pen function to be canceled and starting an erasing function, and displaying, in the middle region, the secondary-level menu option of the option of the eraser tool, where the secondary-level menu option includes an eraser size adjusting option or an adjusting option for a size of the erasing area at a certain moment; and in response to a continuous double-clicking operation from the user on the displayed option of the writing pen tool and the displayed option of the eraser tool, canceling the erasing function of the writing pen and recovering the writing pen function, and recovering displaying of, in the middle region, the secondary-level menu option of the option of the writing pen tool, where the secondary-level menu option includes an adjusting option of a writing pen trajectory thickness.

In some implementations, in the menu display method provided by the embodiment of the present disclosure, the block-shaped sub-region where the handwriting tool is located has a handwriting function closing tool inside; and in response to a selecting operation from the user on the handwriting function closing tool, a handwriting tool function is closed, and a gesture recognition function is started at the same time.

In some implementations, the menu display method provided by the embodiment of the present disclosure further includes:

at a starting stage of the gesture recognition function, after detecting a clicking operation on the middle region, starting the handwriting tool function, and closing the gesture recognition function at the same time.

In some implementations, the menu display method provided by the embodiment of the present disclosure further includes:

detecting a contact area of touch when the user operates the touch display screen; and when determining that the contact area is greater than a set value, increasing an area of the displayed writing configuration menu, and enlarging areas of regions in the writing configuration menu proportionally.

In another aspect, an embodiment of the present disclosure further provides a control method of a writing tool attribute, including:

displaying a writing tool bar on a writing application, where the writing tool bar includes one or more writing tool icons; the one or more writing tool icons include at least one of an icon of a handwriting tool, an icon of a writing pen tool and an icon of an eraser tool; and the writing tool bar includes an annular region; and in response to an operation from a user along the annular region, changing an attribute of a selected writing tool, where the writing tool attribute includes at least one of a trajectory thickness, trajectory transparency, a trajectory color, an erasing area or an erasing shape.

In some implementations, the control method provided by the embodiment of the present disclosure specifically includes:

when the selected writing tool is the eraser tool, in response to a sliding or clicking operation from the user along the annular region, enlarging or reducing a size of the erasing area of the eraser tool;

when the selected writing tool is the handwriting tool or the writing pen tool, in response to a sliding or clicking operation from the user along the annular region, increasing or decreasing a width of a trajectory; or, in response to the sliding or clicking operation from the user along the annular region, enhancing or weakening the trajectory transparency; or, in response to the sliding or clicking operation from the user along the annular region, changing the trajectory color.

In another aspect, an embodiment of the present disclosure further provides an electronic interactive tablet, including: a touch display panel and a processor; where the processor is configured to execute the menu display method of the electronic interactive tablet provided by the embodiment of the present disclosure.

In another aspect, an embodiment of the present disclosure further provides an electronic interactive tablet, including: a touch display panel and a processor; where the processor is configured to execute the control method of the writing tool attribute provided by the embodiment of the present disclosure.

BRIEF DESCRIPTION OF THE DRAWINGS

FIG. 1 is a flow diagram of a menu display method provided by an embodiment of the present disclosure.

FIG. 2 is another flow diagram of a menu display method provided by an embodiment of the present disclosure.

FIG. 3 is another flow diagram of a menu display method provided by an embodiment of the present disclosure.

FIG. 4 is another flow diagram of a menu display method provided by an embodiment of the present disclosure.

FIG. 20 is a flow diagram of a control method of a writing tool attribute provided by an embodiment of the present disclosure.

FIG. 21A and FIG. 21B are schematic diagrams of the control method of the writing tool attribute when a writing tool is an eraser provided by an embodiment of the present disclosure respectively.

FIG. 22 is a schematic structural diagram of an electronic interactive tablet provided by an embodiment of the present disclosure.

DETAILED DESCRIPTION OF THE EMBODIMENTS

Figure 5:
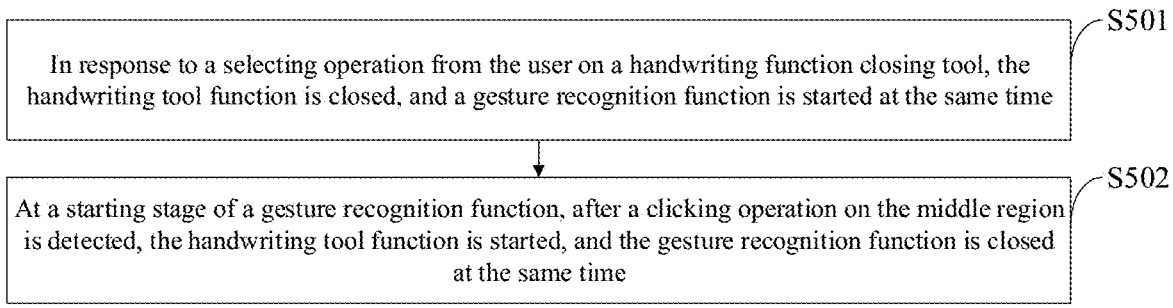
FIG. 5 is another flow diagram of a menu display method provided by an embodiment of the present disclosure.

The detailed description of an electronic interactive tablet, a menu display method and a writing tool attribute control method provided by embodiments of the present disclosure will be illustrated in detail below in conjunction with the accompanying drawings. It needs to be noted that the described embodiments are only part of the embodiments of the present disclosure, not all of the embodiments. Based on the embodiments of the present disclosure, all other embodiments obtained by those of ordinary skill in the art without creative work shall fall within the protection scope of the present disclosure.

An embodiment of the present disclosure provides a menu display method of an electronic interactive tablet. The electronic interactive tablet includes a touch display screen, and as shown in FIG. 1, the menu display method specifically includes the following steps.

S101, a writing configuration menu is displayed on the touch display screen, where the writing configuration menu includes a plurality of first-level menu options which are in one-to-one correspondence with one or more writing tools; where the writing configuration menu has a regular shape, and the regular shape contains a middle region and at least one annular region surrounding the middle region; the at least one annular region includes a plurality of block-shaped sub-regions, each of the plurality of block-shaped sub-regions displays one of the plurality of first-level menu options correspondingly, and the middle region is configured to display secondary-level menu options of the first-level menu options.

Exemplarily, there is only one annular region, and the annular region includes a plurality of block-shaped sub-regions.

Exemplarily, there are two annular regions, one of the annular regions includes a plurality of block-shaped sub-regions, and the other annular region is an annular progress bar.

Exemplarily, there are two or more annular regions, at least two of the annular regions include a plurality of block-shaped sub-regions respectively, and other annular regions are annular progress bars.

Exemplarily, part or all of the one or more annular regions have regular shapes such as circle, square, rectangle or ellipse.

Exemplarily, geometric centers of the plurality of annular regions are the same coordinate position on the touch display screen, and covering regions of the different annular regions on the touch display screen have no overlapping.

Exemplarily, the plurality of first-level menu options are displayed in at least one of all the annular regions. For example, the plurality of first-level menu options are displayed in one of the annular regions, or the plurality of first-level menu options are displayed in all the annular regions, or the plurality of first-level menu options are displayed in part of the annular regions. Illustration is made below by taking an example that the outermost annular region is a first annular region, and the first annular region displays the plurality of first-level menu options.

Exemplarily, in response to a calling operation from a user on the writing configuration menu of a writing application of the touch display screen, the plurality of first-level menu options are displayed in the first annular region.

The outermost annular region is an annular region farthest from a center region.

Exemplarily, the middle region is only configured to display the secondary-level menu option, and the middle region may not display the secondary-level menu option when no first-level menu option is selected. The first-level menu options serve as menu options of the first level, and the secondary-level menu options thereof may be menu options of the second level or menu options of the third level. When the secondary-level menu options displayed in the middle region are the menu options of the third level, one level of menu options may be added. For example, the menu options of the second level are displayed in an annular region other than the first annular region.

Exemplarily, the electronic interactive tablet where the menu display method provided by the embodiments of the present disclosure is applied has an intelligent operating system, such as single-system android and windows, and double-system android and windows. Corresponding applications may be carried to receive and process touch events, meanwhile, the writing application of the electronic interactive tablet outputs corresponding interfaces.

Exemplarily, in the menu display method provided by the embodiments of the present disclosure, when the user needs to perform writing configuration in the process of writing by using the electronic interactive tablet, the writing configuration menu with a plurality of levels of menu options may be called, and the user may directly and quickly perform writing configuration in various levels of menu options, thereby improving operating efficiency.

In some implementations, in the menu display method provided by the embodiments of the present disclosure, types of the plurality of first-level menu options include a plurality of writing tool options, such as one or more of an option of a handwriting tool, an option of a writing pen tool, an option of an eraser tool, an option of a file inserting tool, an option of a canvas dragging tool, an option of a revocation function and an option of a recovery function. The option of the revocation function and the option of the recovery function may be revocation or recovery for writing contents of a certain writing operation, or revocation or recovery of a certain erasing operation.

Exemplarily, in the menu display method provided by the embodiments of the present disclosure, the touch display screen may be jointly supported by one or two touch modules; one touch module supports, for example, touch by hands through resistance, capacitance or infrared; and the other touch module may support touch by a writing pen through electromagnetic induction. Writing by the writing pen is induced through an electromagnetic induction module of the touch display screen; and touch position coordinates, a pen pressure, a pen direction and a setting state of the pen are reported to a processor of the touch display screen. Generally, a pen body of the writing pen has a switching button to switch different states of the writing pen; and when the user switches the different states of the writing pen through the button, the electronic interactive tablet may determine the current state of the writing pen according to an obtained touch event.

Illustration is made below by taking an example that the writing pen is switched among four states. For example, in the writing configuration menu shown in FIG. 7A to FIG. 11D, M1-1 to M1-6 are the first-level menu options, M2 is a secondary-level menu option; and it is set that M1-1 is the option of the handwriting tool, M1-2 is the option of the eraser tool, M1-3 is an option of a writing pen tool state 1, M1-4 is an option of a writing pen tool state 2, M1-5 is an option of a writing pen tool state 3, and M1-6 is an option of a writing pen tool state 4. The different states of the writing pen tool may be distinguished by lighting indicator lamps of different colors on the pen body of the writing pen.

Exemplarily, the secondary-level menu option M2 corresponding to the option M1-1 of the handwriting tool may include a width of a trajectory, namely a trajectory thickness, transparency of the trajectory, a color of the trajectory and other parameter configurations; the secondary-level menu options M2 capable of being independently configured for the different states of the writing pen include the color of the trajectory, the width of the trajectory, the transparency of the trajectory and other parameter configurations; and the secondary-level menu option M2 corresponding to the eraser option M1-2 may include an erasing area of the eraser, an erasing shape of the eraser and other parameter configurations. In other words, it may be considered that the secondary-level menu option M2 is adjustment to different attributes of the writing tool. Exemplarily, the attribute of the writing pen tool may include at least one of the width of the trajectory, the transparency of the trajectory or the color of the trajectory; the attribute of the handwriting tool may include at least one of the width of the trajectory, the transparency of the trajectory or the color of the trajectory; and a plurality of attributes of the eraser tool may include at least one of the erasing area of the eraser or the erasing shape of the eraser.

Figure 7A:
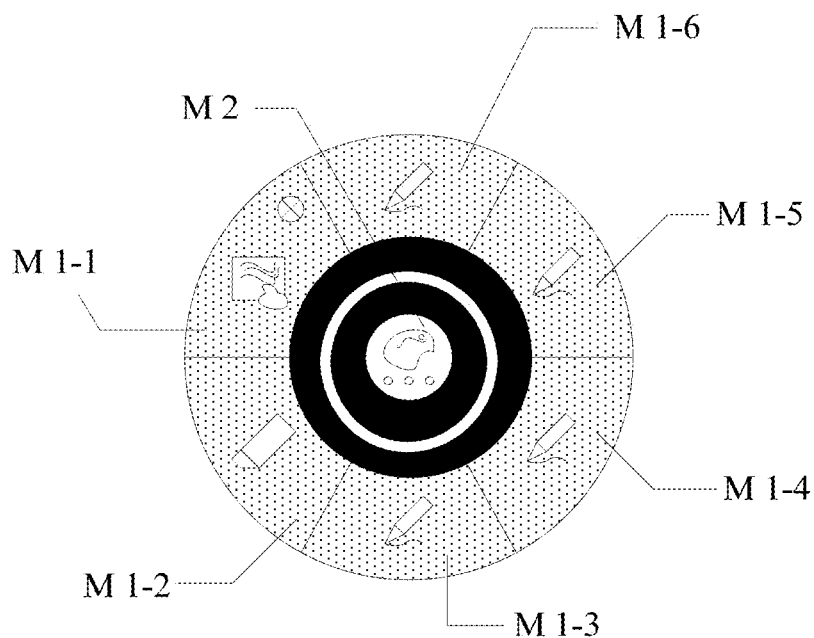
FIG. 7A and FIG. 7B are schematic diagrams of a writing configuration menu in an electronic interactive tablet provided by an embodiment of the present disclosure respectively.
Figure 7B:
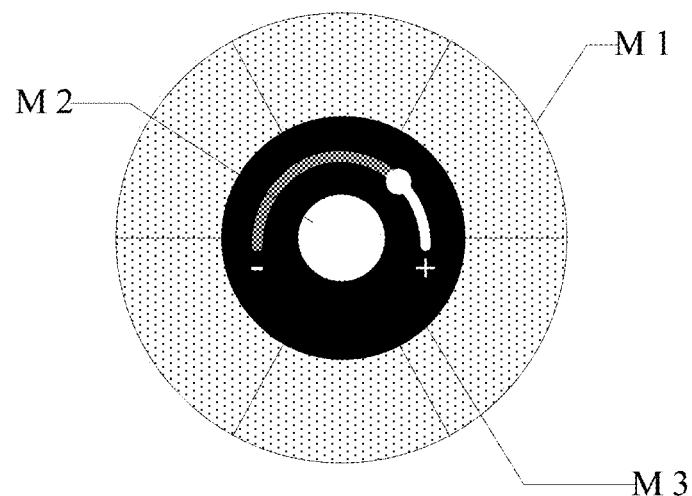
Figure 8A:
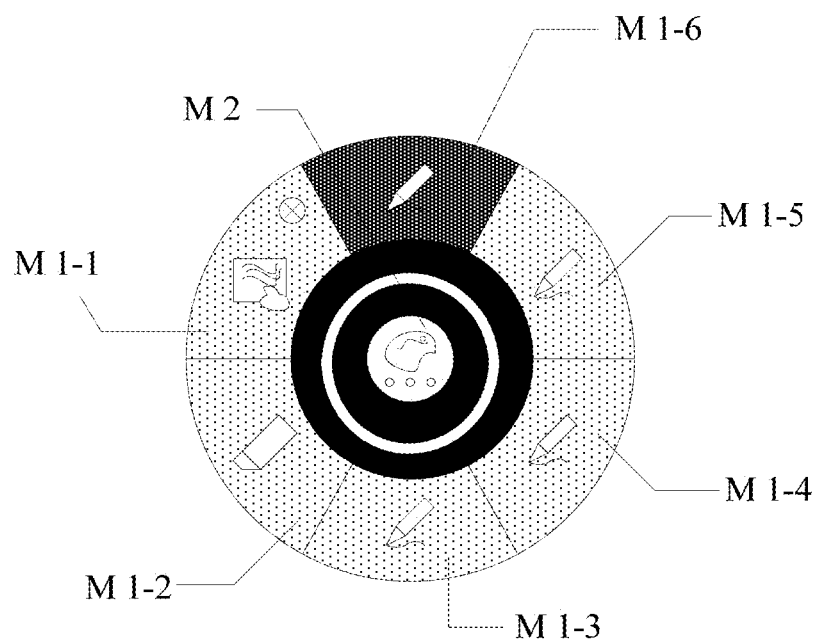
FIG. 8A to FIG. 8D are other schematic diagrams of a writing configuration menu in an electronic interactive tablet provided by an embodiment of the present disclosure respectively.
Figure 8B:
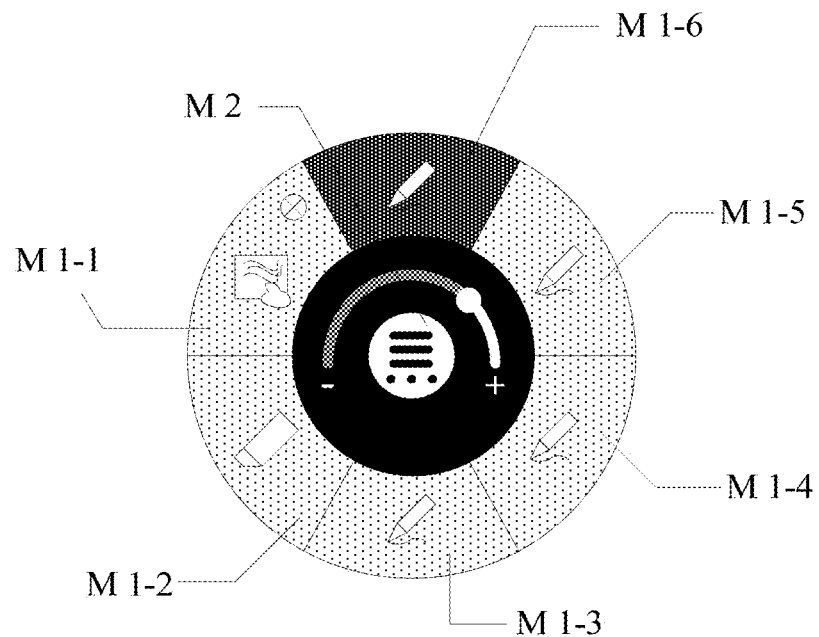
Figure 8C:
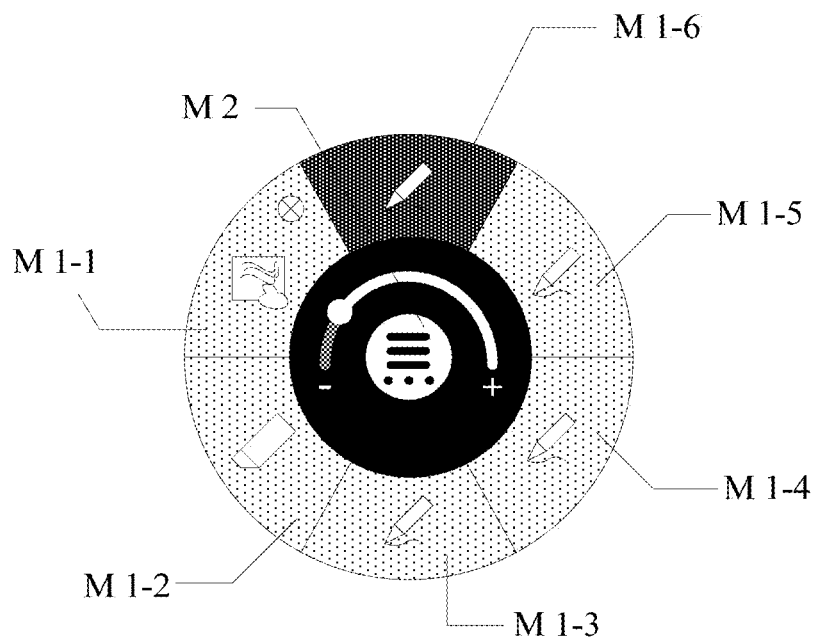
Figure 8D:
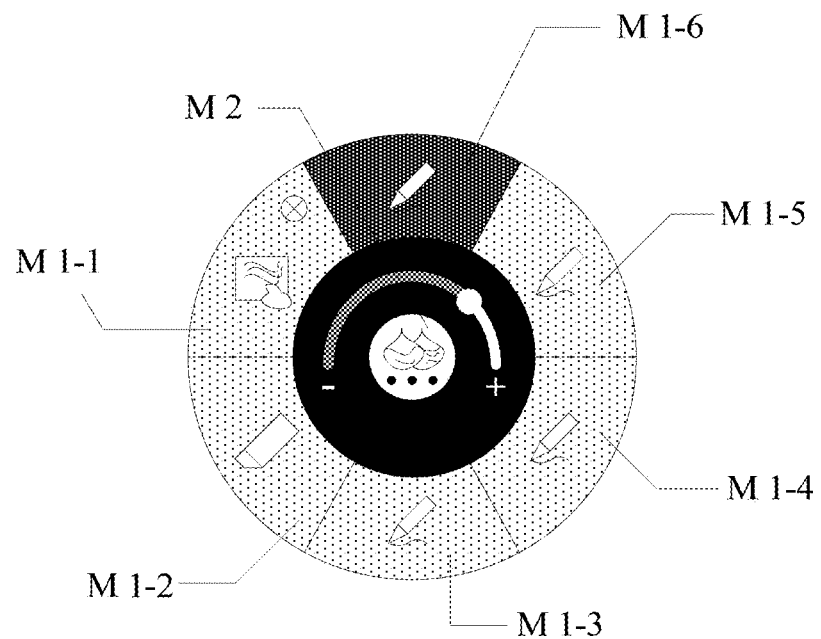
Figure 9A:
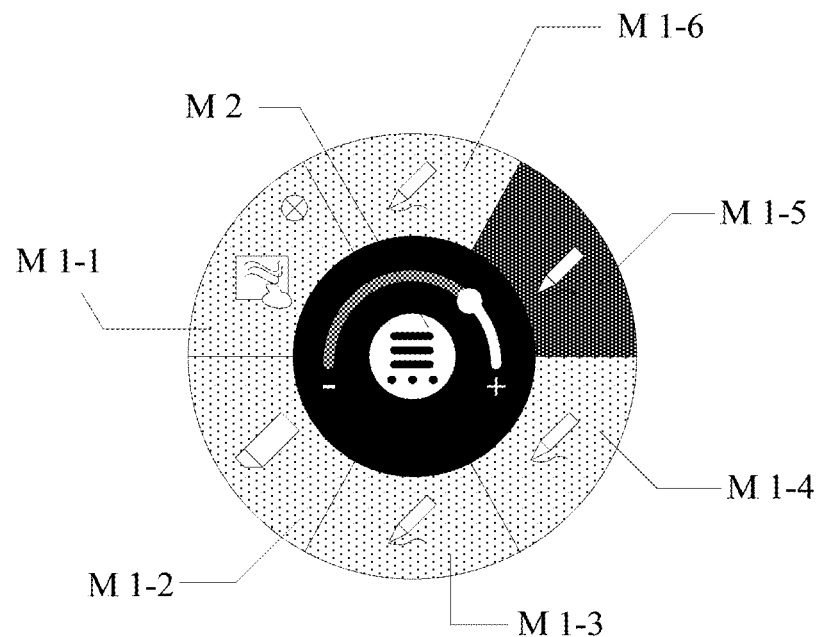
FIG. 9A to FIG. 9C are other schematic diagrams of a writing configuration menu in an electronic interactive tablet provided by an embodiment of the present disclosure respectively.
Figure 9B:
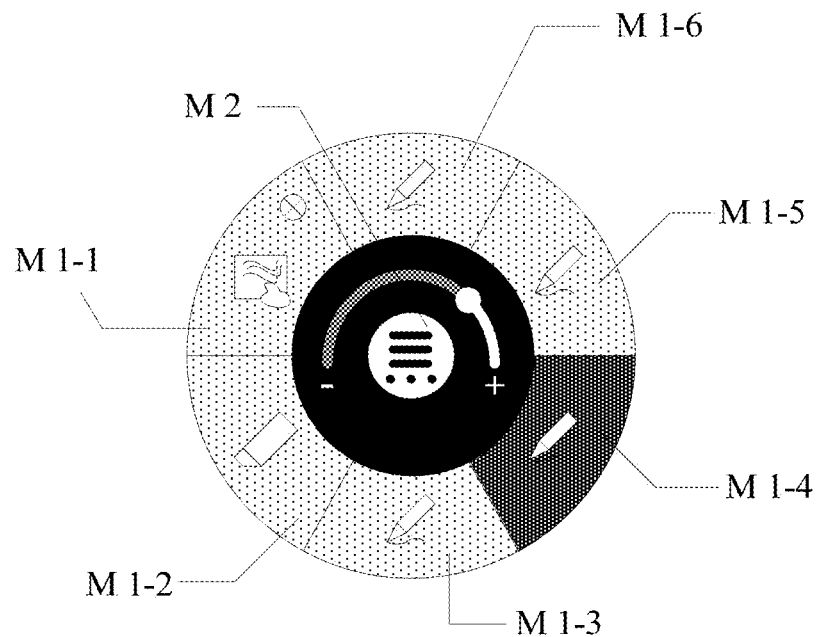
Figure 9C:
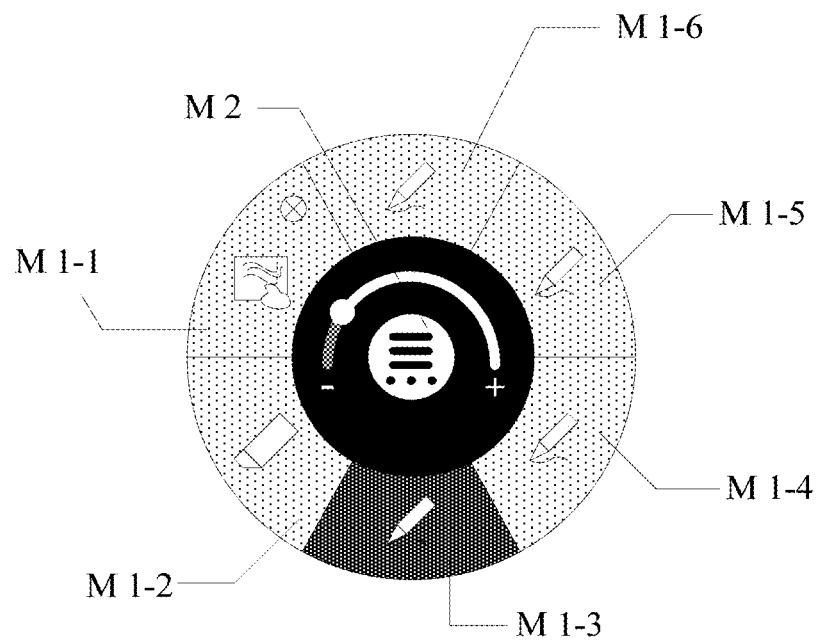
Figure 10A:
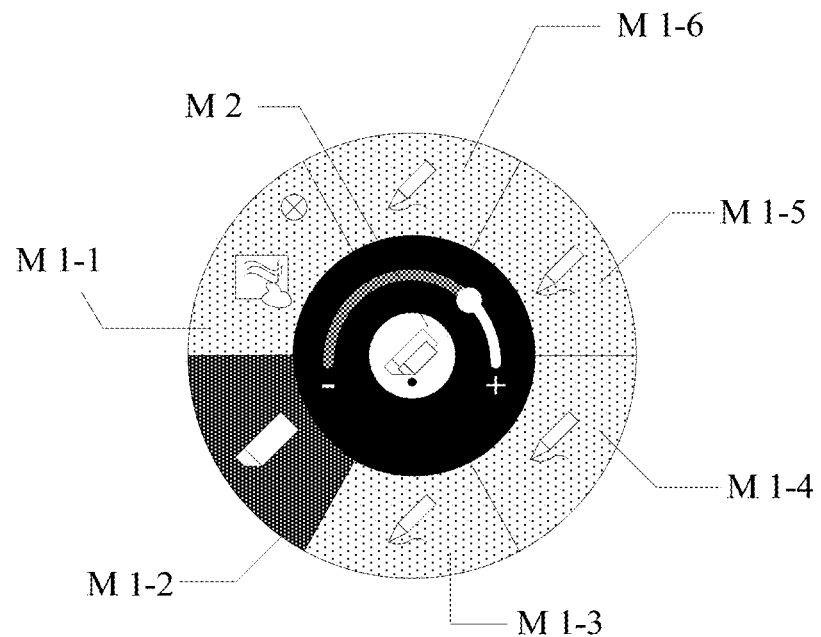
FIG. 10A to FIG. 10B are other schematic diagrams of a writing configuration menu in an electronic interactive tablet provided by an embodiment of the present disclosure respectively.
Figure 10B:
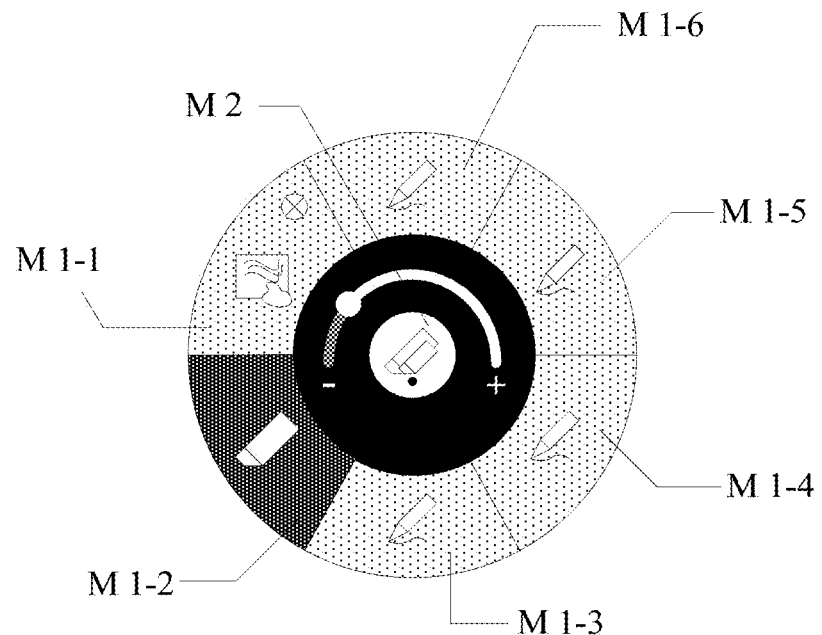
Figure 11A:
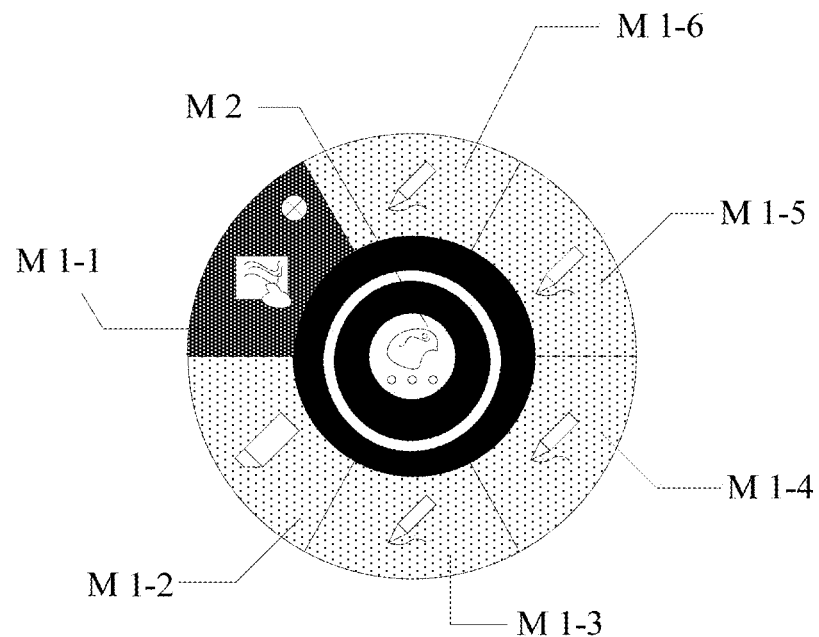
FIG. 11A to FIG. 11D are other schematic diagrams of a writing configuration menu in an electronic interactive tablet provided by an embodiment of the present disclosure respectively.
Figure 11B:
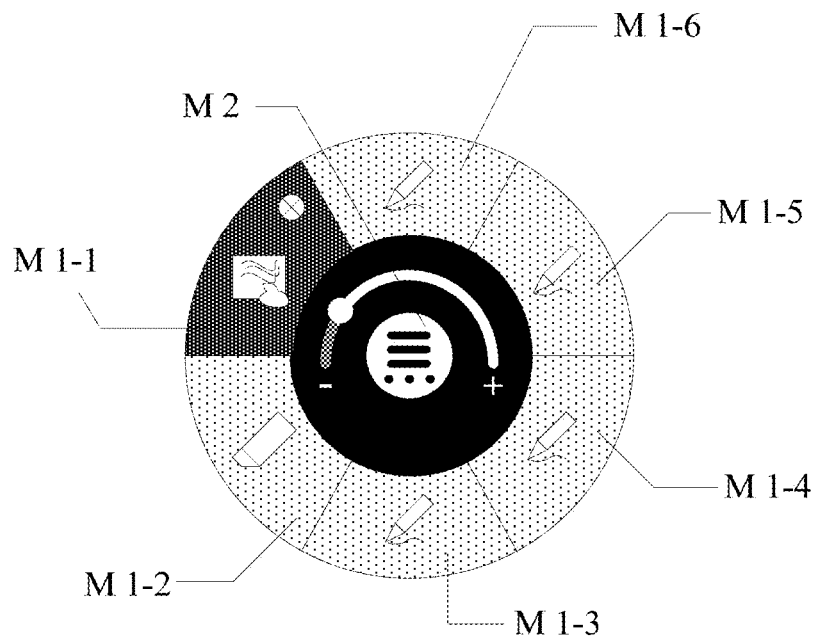
Figure 11C:
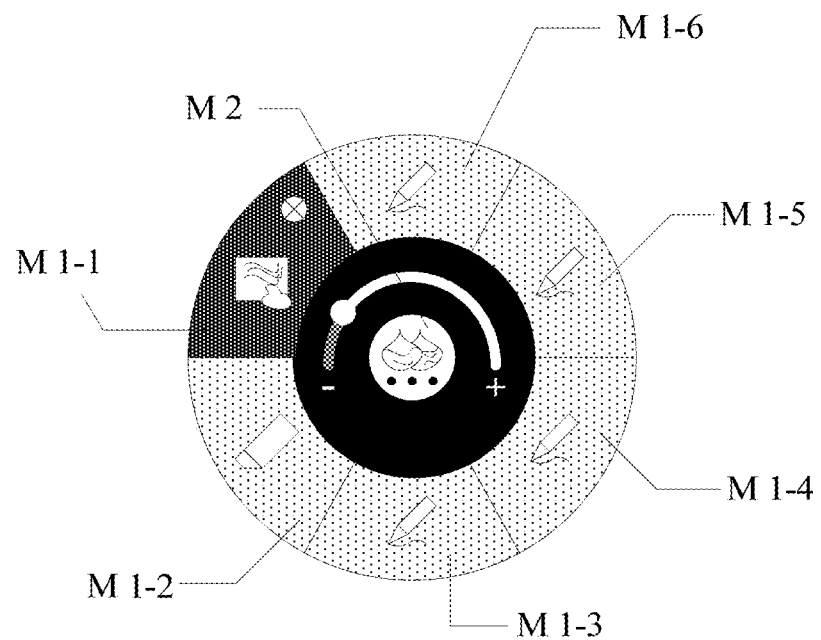
Figure 11D:
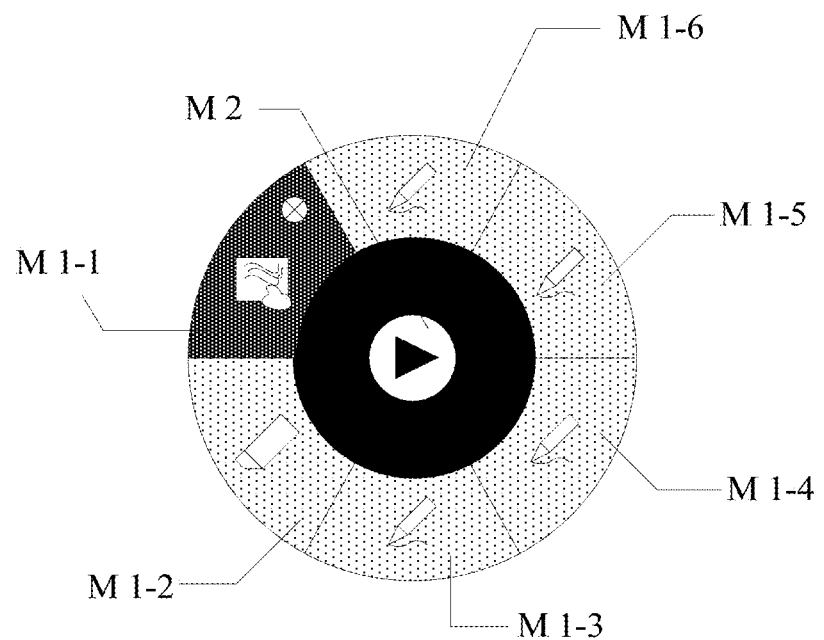

Exemplarily, FIG. 7A and FIG. 7B show schematic diagrams when the first-level menu options in the writing configuration menu are not selected respectively. FIG. 8A shows a schematic diagram that the displayed secondary-level menu option M2 is the color of the trajectory when the option M1-6 of the writing pen tool state 4 in the writing configuration menu is selected. FIG. 8B and FIG. 8C show schematic diagrams that the displayed secondary-level menu option M2 is the width of the trajectory when the option M1-6 of the writing pen tool state 4 in the writing configuration menu is selected. FIG. 8D shows a schematic diagram that the displayed secondary-level menu option M2 is the transparency of the trajectory when the option M1-6 of the writing pen tool state 4 in the writing configuration menu is selected. FIG. 9A shows a schematic diagram that the displayed secondary-level menu option M2 is the color of the trajectory when the option M1-5 of the writing pen tool state 3 in the writing configuration menu is selected. FIG. 9B shows a schematic diagram that the displayed secondary-level menu option M2 is the color of the trajectory when the option M1-4 of the writing pen tool state 2 in the writing configuration menu is selected. FIG. 9C shows a schematic diagram that the displayed secondary-level menu option M2 is the color of the trajectory when the option M1-3 of the writing pen tool state 1 in the writing configuration menu is selected. FIG. 10A and FIG. 10B respectively show schematic diagrams that the displayed secondary-level menu option M2 is the erasing area when the option M1-2 of the eraser tool in the writing configuration menu is selected. FIG. 11A shows a schematic diagram that the displayed secondary-level menu option M2 is the color of the trajectory when the option M1-1 of the handwriting tool in the writing configuration menu is selected. FIG. 11B shows a schematic diagram that the displayed secondary-level menu option M2 is the width of the trajectory when the option M1-1 of the handwriting tool in the writing configuration menu is selected. FIG. 11C shows a schematic diagram that the displayed secondary-level menu option M2 is the transparency of the trajectory when the option M1-1 of the handwriting tool in the writing configuration menu is selected. FIG. 11D shows a schematic diagram when the option M1-1 of the handwriting tool in the writing configuration menu is selected and a gesture recognition function is started.

Exemplarily, each writing tool includes one or more attributes, and the secondary-level menu option of the first-level menu option corresponding to one writing tool is configured to display the one or more attributes. When the current writing tool includes the plurality of attributes, in response to an operation from the user on the currently displayed writing tool attribute of the secondary-level menu option, the current writing tool attribute is switched and the switched writing tool attribute is displayed. For example, as shown in FIG. 8A, the attribute of the color of the trajectory of the option of the writing pen tool state 4 is currently displayed, it may be switched to the attribute of the width of the trajectory displayed in FIG. 8B and may also be switched to the attribute of the transparency of the trajectory displayed in FIG. 8D. For another example, as shown in FIG. 11A, the attribute of the color of the trajectory of the option of the handwriting tool is currently displayed, it may be switched to the attribute of the width of the trajectory displayed in FIG. 11B and may also be switched to the attribute of the transparency of the trajectory displayed in FIG. 11C.

Exemplarily, in response to a clicking or continuous clicking operation from the user on the currently displayed writing tool attribute of the secondary-level menu option, namely the clicking or double-clicking operation on the middle region, the current writing tool attribute may be switched and the switched writing tool attribute is displayed.

Exemplarily, in the electronic interactive tablet where the menu display method provided by the embodiments of the present disclosure is applied, in order to visually select the first-level menu option required to be configured by the user to improve the menu configuration efficiency, in response to the calling operation from the user on the writing configuration menu of the writing application of the touch display screen, the plurality of first-level menu options may be displayed in the first annular region M1, and different first-level menu options may be displayed in the block-shaped sub-regions in the displayed writing configuration menu. Exemplarily, the shape of the writing configuration menu may be specifically a circle, a rectangle and other regular shapes, which is not limited here. The shape of the middle region may be consistent with the shape of the writing configuration menu.

Figure 12:
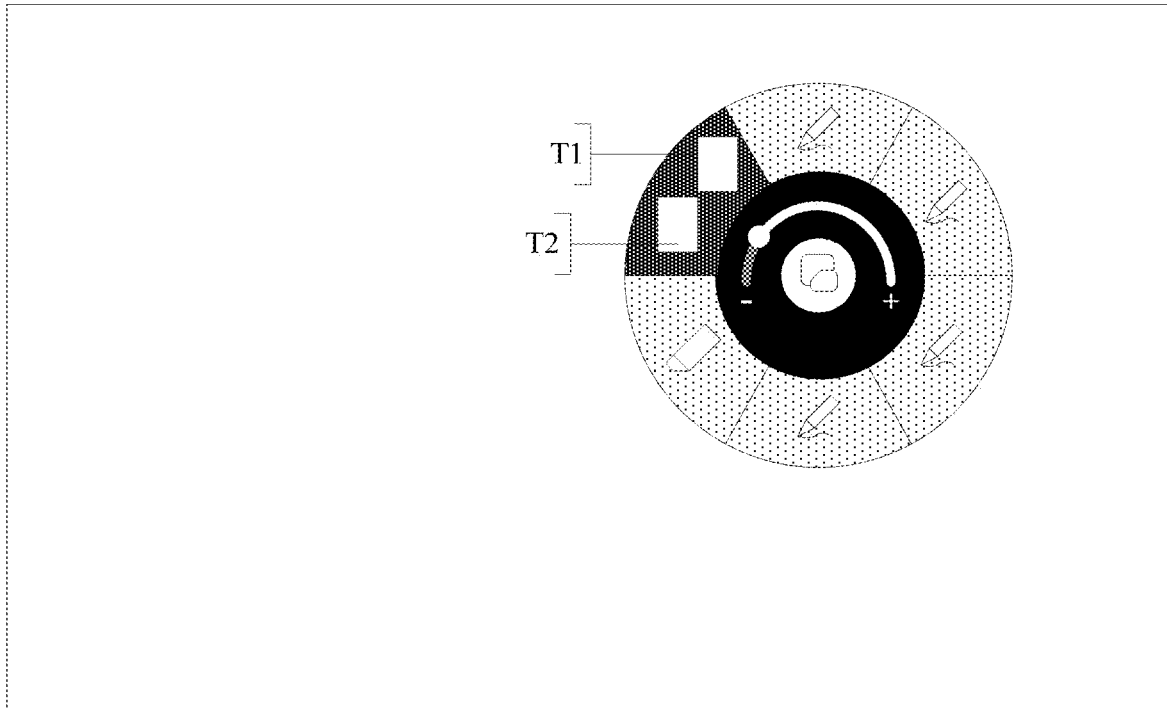
FIG. 12 is another schematic diagram of a writing configuration menu in an electronic interactive tablet provided by an embodiment of the present disclosure.

Exemplarily, in the menu display method provided by the embodiments of the present disclosure, when many first-level menu options need to be displayed and the first annular region of the writing configuration menu cannot display all the options in the case of guaranteeing the proper font size, as shown in FIG. 12, taking an example that the optimal display effect is displaying six block-shaped sub-regions, if seven first-level menu options are configured currently, that is, the number of the block-shaped sub-regions is smaller than the total number of the first-level menu options, only part of the first-level menu options may be displayed in the first annular region. In response to a sliding operation from the user on the first annular region, the first-level menu options that have been displayed are controlled to move along a sliding direction, at least one first-level menu option is newly displayed in the annular region, and at least one first-level menu option that has been displayed is concealed at the same time. The sliding direction of the sliding operation corresponds to an annular extending direction of the annular region.

Exemplarily, the first annular region is a ring or an elliptical ring, the first-level menu options are sequentially arranged in the first annular region, and the block-shaped sub-regions are consistent in shape and size. In response to a selecting operation that the user selects the first annular region and performs a clockwise or anticlockwise operation, the first-level menu options that have been displayed are controlled to rotate clockwise or anticlockwise along an edge of the first annular region, at least one first-level menu option is controlled to be newly displayed in the first annular region, and at least one first-level menu option that has been displayed is concealed at the same time.

Exemplarily, in response to a touch operation from the user on one first-level menu option in the first annular region, the first annular region is controlled to newly display one first-level menu option, and the first-level menu option subjected to the touch operation is concealed or deleted at the same time. The touch operation is a deleting operation or a concealing operation. The deleting operation or the concealing operation includes: an outward sliding operation relative to the middle region, or a continuous clicking operation.

As shown in FIG. 12, one of the block-shaped sub-regions may be selected to be defined as a to-be-displayed region, one corresponding first-level menu option is displayed in each of the block-shaped sub-regions other than the to-be-displayed region, and thumbnails T1 and T2 of the concealed first-level menu options are displayed in the to-be-displayed region. For example, thumbnails of two first-level menu options are displayed in the upper left block-shaped sub-region, and five first-level menu options are displayed in the rest of the block-shaped sub-regions. In order to achieve switching of the displayed first-level menu options, in response to an edge sliding instruction from the user on the writing configuration menu, the first-level menu options are rotated along the sliding direction to be moved to the correspondingly next block-shaped sub-regions, the thumbnail corresponding to the first-level menu option moved into the to-be-displayed region is displayed in the to-be-displayed region, and meanwhile, the first-level menu option corresponding to one thumbnail in the to-be-displayed region is controlled to slide out to the adjacent block-shaped sub-region. Exemplarily, the displayed first-level menu options may be switched by sliding the edge of the writing configuration menu, taking sliding the edge of the writing configuration menu clockwise as an example, the first-level menu option M1-2 corresponding to the eraser slides into the to-be-displayed region to be displayed as a thumbnail, the thumbnail T1 in the to-be-displayed region slides out of the to-be-displayed region and slides into the block-shaped sub-region clockwise adjacent to the to-be-displayed region to display the corresponding first-level menu option, and other first-level menu options move by one block-shaped sub-region along a clockwise direction respectively, so that switching of displaying of the first-level menu options is completed.

Exemplarily, in the menu display method provided by the embodiments of the present disclosure, in the displayed writing configuration menu, as shown in FIG. 7A and FIG. 7B, the block-shaped sub-regions at an initial state may be not selected, the user needs to actively select the first-level menu option in a certain block-shaped sub-region; a certain block-shaped sub-region may also be selected at the initial state according to a preset condition, that is, in response to the calling operation from the user on the writing configuration menu of the writing application of the touch display screen, the plurality of first-level menu options are displayed in the first annular region and a selected function of one of the first-level menu options is started, and the secondary-level menu option of the started first-level menu option is displayed in the middle region at the same time; or, in response to a selecting operation from the user on one of the first-level menu options, the secondary-level menu option of the selected first-level menu option is displayed in the middle region.

Exemplarily, for example, in response to a writing tool used when the user performs the calling operation, the block-shaped sub-region where the first-level menu option matched with the writing tool is located is selected in the writing configuration menu. For example: if the writing configuration menu is called by a hand, as shown in FIG. 11A, a focus automatically selects the block-shaped sub-region where the option M1-1 of the handwriting tool is located; if the writing configuration menu is called by using the writing pen, the focus is automatically switched to a certain block-shaped sub-region where one of the options M1-3 to M1-6 of the writing pen tool is located according to a current state of the writing pen; for example, if the writing configuration menu is called in the case of the writing pen state 2, the focus automatically selects the option M1-4 of the writing pen tool. The focus of the first-level menu option is automatically switched according to the writing tool used for the calling operation, so that operating efficiency is greatly improved, and user experience is improved.

Exemplarily, in the writing configuration menu displayed in response to the calling operation of the writing configuration menu, no matter whether the certain block-shaped sub-region is selected, the middle region may not display any secondary-level menu option M2 when not selected. Or, as shown in FIG. 8A to FIG. 11C, in response to a selecting operation from the user on one of the plurality of block-shaped sub-regions, and when the block-shaped sub-region where the first-level menu option corresponding to the writing tool is located is selected in the writing configuration menu in response to the writing tool used when the user performs the calling operation, the secondary-level menu option of the first-level menu option corresponding to the selected block-shaped sub-region may be displayed in the middle region. For example, as shown in FIG. 11A to FIG. 11D, the block-shaped sub-region where the option of the handwriting tool is located is selected (the handwriting option may be selected by the user or automatically selected according to the writing tool), so the corresponding secondary-level menu option M2 is displayed in the middle region. For example, as shown in FIG. 10A and FIG. 10B, the block-shaped sub-region where the option of the eraser tool is located is selected, so the corresponding secondary-level menu option M2 is displayed in the middle region. For example, as shown in FIG. 8A to FIG. 8D, the block-shaped sub-region where the option of the writing pen state 4 is located is selected, so the corresponding secondary-level menu option M2 is displayed in the middle region.

Exemplarily, after the block-shaped sub-region where the first-level menu option required to be configured is located is selected, parameter setting is performed on the secondary-level menu option, displayed in the middle region M2, of the selected first-level menu option, so that parameters of various writing manners may be quickly set, which greatly improves the operating efficiency and improves user experience. Exemplarily, in response to an operation from the user on the secondary-level menu option displayed in the middle region, writing tool attributes of functions corresponding to the secondary-level menu option may be adjusted.

Exemplarily, in the secondary-level menu option for adjusting the parameters such as the trajectory thickness and the size, a sliding button may be displayed in the secondary-level menu option, the sliding button is clicked to be in an activated state identifier, and then parameter change may be displayed by the size of a dot of the sliding button. In the secondary-level menu option for adjusting the parameters such as the color and the transparency, when the circular button is slid, the color of the circular button may be the color of a current color ring, or the transparency of the circular button may be the current transparency.

Or, as shown in FIG. 7B, the annular region adjacent to the middle region M2 is set to be a second annular region M3, and an attribute progress bar matched with the currently displayed secondary-level menu option is displayed in the second annular region M3. For example, a first-level menu is an eraser, the secondary-level menu is a size of the eraser, the attribute progress bar matched with the secondary-level menu is a progress bar of the size of the eraser, and the size of the eraser may be adjusted by adjusting the progress bar. For example, the first-level menu is a writing pen, the writing pen has three secondary-level menus (a width of a trajectory, writing transparency and a color of the writing trajectory), only one secondary-level menu is displayed at the current moment, and the currently displayed secondary-level menu is switched after a switching operation. There is a progress bar for each secondary-level menu, and by sliding the progress bar in the second annular region, the width of the trajectory, the writing transparency or the color of the writing trajectory may be adjusted.

Specifically, in response to a sliding or clicking operation from the user along the attribute progress bar corresponding to the area of the eraser tool, a size of the erasing area of the eraser tool may be enlarged or reduced to erase writing contents in the writing application according to the enlarged or reduced eraser. For example, state change of the attribute progress bars shown from FIG. 10A to FIG. 10B corresponds to reducing of the erasing area of the eraser tool, and state change of the attribute progress bars shown from FIG. 10B to FIG. 10A corresponds to enlarging of the erasing area of the eraser tool.

In other embodiments, in response to a sliding or clicking operation from the user along the attribute progress bar corresponding to the width of the trajectory of the writing pen tool or the handwriting tool, the width of the trajectory is increased or decreased to write according to the adjusted width of the trajectory. For example, state change of the attribute progress bars shown from FIG. 8B to FIG. 8C corresponds to decreasing of the width of the trajectory, and state change of the attribute progress bars shown from FIG. 8C to FIG. 8B corresponds to increasing of the width of the trajectory.

In other embodiments, in response to a sliding or clicking operation from the user along the attribute progress bar corresponding to the transparency of the trajectory of the writing pen tool or the handwriting tool, the transparency of the trajectory is enhanced or weakened to write according to the adjusted transparency of the trajectory.

In other embodiments, in response to a sliding or clicking operation from the user along the attribute progress bar corresponding to the color of the trajectory of the writing pen tool or the handwriting tool, the color of the trajectory is changed for writing according to the adjusted color of the trajectory.

In other embodiments, the secondary-level menu option is configured to display the plurality of attributes, and the method further includes: in response to an operation from the user on the currently displayed writing tool attribute of the secondary-level menu option, the current writing tool attribute is switched and the switched writing tool attribute is displayed. The types of the plurality of first-level menu options include one or more of the option of the handwriting tool, the option of the writing pen tool, the option of the eraser tool, the option of the file inserting tool, the option of the canvas dragging tool, the option of the revocation function and the option of the recovery function.

The attribute of the writing pen tool includes at least one of the width of the trajectory, the transparency of the trajectory or the color of the trajectory; the attribute of the handwriting tool includes at least one of the width of the trajectory, the transparency of the trajectory or the color of the trajectory; and a plurality of attributes of the eraser tool include at least one of the erasing area of the eraser or the erasing shape of the eraser.

The annular region adjacent to the middle region is a second annular region. The method further includes: a parameter adjusting icon of an attribute matched with the displayed secondary-level menu option is displayed in the second annular region, for example, an attribute progress bar and/or the parameter adjusting icon of the attribute, such as "+" and "−" icons, matched with the displayed secondary-level menu option, is displayed in the second annular region.

In response to an operation from the user on the "+" or "−" icon, the size of the erasing area of the eraser tool is enlarged or reduced, or the width of the trajectory is increased or decreased, or the transparency of the trajectory is increased or decreased, or the color of the trajectory is changed.

Exemplarily, the clicking operation refers to directly clicking a certain position of the selected attribute progress bar, and the sliding operation refers to dragging and sliding on the attribute progress bar.

Exemplarily, at least one writing tool may include a plurality of attributes. For example, the plurality of attributes of the writing pen tool and the handwriting tool include attributes such as the width of the trajectory, the transparency of the trajectory, the color of the trajectory, etc.; and the plurality of attributes of the eraser tool include attributes such as the area of the eraser, the shape of the eraser, etc. The plurality of secondary-level menu options of the same first-level menu option corresponding to the writing tool are configured to display the plurality of attributes respectively.

The menu display method provided by the embodiments of the present disclosure may further include: in response to an operation from the user on the currently displayed writing tool attribute of the secondary-level menu option, the current writing tool attribute is switched and the switched writing tool attribute is displayed. Exemplarily, in response to a clicking or continuous clicking operation from the user on the currently displayed writing tool attribute of the secondary-level menu option, the current writing tool attribute may be switched and the switched writing tool attribute is displayed.

Exemplarily, in the electronic interactive tablet provided by the embodiments of the present disclosure, in order to lower the complexity of the writing configuration menu and save occupied regions, only one secondary-level menu option M2 corresponding to the selected first-level menu option (focus) may be displayed in the middle region of the writing configuration menu, and then the plurality of secondary-level menu options corresponding to the same first-level menu option are switched as needed. In some implementations, the menu display method provided by the embodiments of the present application, as shown in FIG. 2, may further include the following steps.

S201, in response to a clicking operation from the user on the middle region, the next secondary-level menu option of the first-level menu option corresponding to the selected block-shaped sub-region is displayed in the middle region.

S202, in response to a double-clicking operation from the user on the middle region, the previous secondary-level menu option of the first-level menu option corresponding to the selected block-shaped sub-region is displayed in the middle region.

Exemplarily, by clicking a center region of the secondary-level menu option M2, the secondary-level menu option may be switched to the next secondary-level menu option; when the center region of the secondary-level menu option M2 is double-clicked, the secondary-level menu option may be switched to the previous secondary-level menu option; and switching of the secondary-level menu options may be circulated.

Exemplarily, since the touch display screen in the electronic interactive tablet is large, in order to facilitate the operation of the user, a writing configuration option may be dynamically moved along with a touch position of the user. When a writing configuration menu option is a floating menu, in some implementations, the menu display method provided by the embodiments of the present application, as shown in FIG. 3, may further include the following steps.

S301, in response to a dragging operation from the user on the floating menu, the floating menu is moved according to a dragging trajectory corresponding to the dragging operation.

Exemplarily, the dragging operation refers to an operation that the user touches a certain position in the touch display screen and then moves without lifting the hand. When the floating menu is dragged, the floating menu dynamically moves following a touch position. Exemplarily, the dragging position of the user on the floating menu may be set to be the center region of the middle region, or the whole floating menu, which is not limited here.

Exemplarily, in the menu display method provided by the embodiments of the present disclosure, when displayed on the touch display screen, the writing application includes four sides corresponding to a periphery of the touch display screen. Since the touch display screen is large and the left side to the right side as well as the upper side to the lower side are far away, in order to guarantee that the user can quickly operate without moving the body during the writing operation, generally, the four sides of the writing application are each provided with a writing application navigation bar. Some function keys may be displayed in the navigation bars, such as exiting, minimization, maximization and other function keys, and the same function keys are displayed in the writing application navigation bars on the four sides. Based on this, in some implementations, the menu display method provided by the embodiments of the present application, as shown in FIG. 4, may further include the following steps.

S401, in response to a calling operation from the user on the writing application navigation bar on one of the four sides of the writing application, the writing configuration floating button is displayed on one side of the called writing application navigation bar. Exemplarily, the writing configuration floating button is a button for the writing configuration menu in a folded state, that is, the writing configuration floating button refers to an icon displayed when the writing configuration menu in the writing application is not called. Generally, the writing configuration floating button is only an operating button capable of being touched as a whole, so that the region occupied by the writing configuration menu on the touch display screen is larger than the region occupied by the writing configuration floating button.

Exemplarily, calling the writing application navigation bar on one side of the writing application by the user (i.e., controlling the writing application navigation bar on this side for displaying) shows that the user is close to the writing application navigation bar on this side, and the writing configuration floating button has a function of automatically following the writing application navigation bar and is displayed on the same side as the called writing application navigation bar. For example, when the writing configuration floating button is located on the left side of the screen and the writing application navigation bar on the right side is called, the writing configuration floating button is controlled to automatically move to the right side for displaying.

Figure 13:
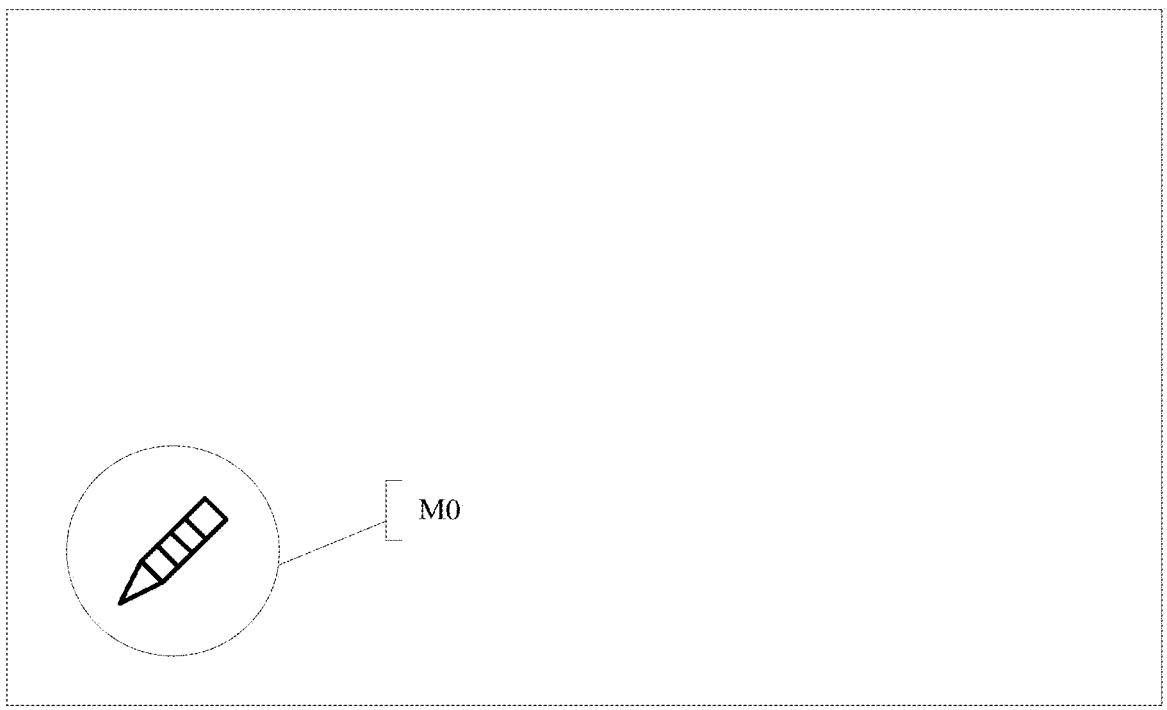
FIG. 13 is a schematic diagram of a writing configuration floating button in an electronic interactive tablet provided by an embodiment of the present disclosure.

In some implementations, in the menu display method provided by the embodiments of the present application, the calling operation from the user on the writing configuration menu of the writing application of the touch display screen may be specifically a selecting operation on the writing configuration floating button displayed by the writing application. FIG. 13 shows a schematic diagram of the writing configuration floating button M0. Exemplarily, in response to a selecting operation from the user on the writing configuration floating button displayed by the writing application, the touch display screen may not display the writing configuration floating button but displays the writing configuration menu, that is, the writing configuration menu replaces the writing configuration floating button for displaying.

Exemplarily, the menu display method provided by the embodiments of the present application may further include: in response to a selecting operation from the user on a position other than the writing configuration menu displayed by the writing application on the touch display screen, the touch display screen does not display the writing configuration menu but displays the writing configuration floating button. That is, when the user performs the selecting operation on a region other than the writing configuration menu displayed by the writing application, it shows that the writing application is in a writing state and writing does not need to be configured, and at the moment, the writing configuration menu is controlled to recover to display the writing configuration floating button, that is, the menu state is the floating button in the writing state, and a writing region may be maximized.

In some implementations, in the menu display method provided by the embodiments of the present application, since the writing configuration menu contains multiple levels of menu options needing to be configured and the writing configuration floating button is only a touchable operating button, the region occupied by the writing configuration menu may be set to be larger than the region occupied by the writing configuration floating button to guarantee that the writing region is maximized in the writing state. FIG. 13 shows the schematic diagram of the writing configuration floating button M0 in the writing state. Generally, when the writing configuration menu and the writing configuration floating button are mutually switched for displaying, displaying switching of two icons may be performed with a center position as an origin, that is, when the writing configuration floating button is clicked, the writing configuration menu is displayed in the center of the position where the writing configuration floating button is located. However, the situation that the writing configuration menu cannot be completely displayed will occur if the writing configuration floating button is located at the edge of the writing application, and based on this, following ways may be specifically adopted to achieve that the touch display screen does not display the writing configuration floating button but displays the writing configuration menu.

Whether a relation between the position where the writing configuration floating button is located and the display edge of the writing application meets a condition for completely displaying the writing configuration menu is determined;

if yes, the writing configuration menu is displayed with the position where the writing configuration floating button is located as a center point of the writing configuration menu to be displayed; and if not, the center point of the writing configuration menu to be displayed is determined and the writing configuration menu is displayed. The center point is a point to which a shortest distance from the display edge is at least one half of a length of the writing configuration menu, that is, if the writing configuration floating button is close to the display edge, it will be automatically adjusted to the position which is closest to the display edge and where the writing configuration menu can be completely displayed for displaying.

Similarly, the following way may be specifically adopted to achieve that the touch display screen does not display the writing configuration menu but displays the writing configuration floating button: the writing configuration floating button is recovered to display with the position where the writing configuration menu is located as a center.

In some implementations, in the menu display method provided by the embodiments of the present application, adaptive icon size switching between finger touch and writing pen point touch may be achieved. When the writing configuration menu is displayed on a small-size panel such as a mobile phone or a pad, if it is detected that the contact area of touch is small, namely, it is matched with a clicking area range of a pen point of the writing pen, the writing configuration menu may be displayed according to a default area; and if it is detected that the contact area of touch is large, namely, it is matched with a clicking area range of a finger, it shows that it is not convenient for the user to click accurately, the area of the writing configuration menu is automatically increased, and regions in the menu are enlarged proportionally. Based on this, the menu display method provided by the embodiments of the present application may include the following steps.

A contact area of touch when the user operates the touch display screen is detected first in real time; and when it is determined that the contact area is greater than a set value, the area of the displayed writing configuration menu is increased, and the areas of the regions in the writing configuration menu are increased proportionally. Exemplarily, the set value may be a minimum value of the clicking area range of a finger.

Exemplarily, in addition to supporting handwriting input and writing pen input, the touch display screen in the electronic interactive tablet provided by the embodiments of the present disclosure may also support gesture control, and different control over the writing application may be achieved according to different gestures. For example: a single-finger moving gesture may achieve overall moving control over the writing application, a two-finger moving gesture may achieve scaling control over the writing application, and a hand-back moving gesture may achieve erasing control over a region in the writing application. Based on this, a block-shaped sub-region where the handwriting tool is located may have a handwriting function closing tool to achieve switching to gesture control, and the handwriting function closing tool may be, for example, an X icon. In some implementations, the menu display method provided by the embodiments of the present application, as shown in FIG. 5, may further include the following steps.

S501, in response to a selecting operation from the user on the handwriting function closing tool, the handwriting tool function is closed, and a gesture recognition function is started at the same time. For example, after the user clicks the X icon, an icon displayed in a writing region in the writing application is changed to a gesture state icon, such as an icon of a hand, and a content displayed in the middle region is changed to an option of recovering the handwriting tool at the same time. After the user clicks the X icon as shown in FIG. 11A to FIG. 11C, a state as shown in FIG. 11D is presented.

S502, at a starting stage of the gesture recognition function, after a clicking operation on the middle region is detected, the handwriting tool function is started, and the gesture recognition function is closed at the same time. For example, after the user clicks the option of recovering the handwriting tool, an icon displayed in the writing region in the writing application is changed to a handwriting state icon, such as an I icon, and the secondary-level menu option of the option of the handwriting tool is recovered to be displayed in the middle region at the same time. After the user clicks the middle region as shown in FIG. 11D, a state as shown in FIG. 11A is presented.

Figure 6:
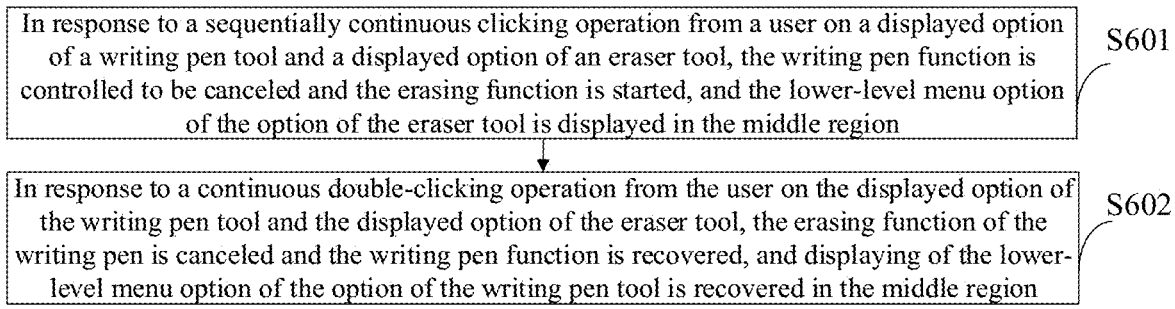
FIG. 6 is another flow diagram of a menu display method provided by an embodiment of the present disclosure.

Exemplarily, in the electronic interactive tablet, an erasing function is generally achieved through a gesture, and in order to set a certain state of the writing pen as the erasing function, in some implementations, the menu display method provided by the embodiments of the present application, as shown in FIG. 6, may further include the following steps.

S601, in response to a sequentially continuous clicking operation from the user on the displayed option of the writing pen tool and the displayed option of the eraser tool, the writing pen function is controlled to be canceled and the erasing function is started, and the secondary-level menu option of the option of the eraser tool is displayed in the middle region, where the secondary-level menu option includes an eraser size adjusting option or an adjusting option for a size of the erasing area at a certain moment. When the user continuously clicks M1-4 in the options M1-3 to M1-6 of a certain setting state of the writing pen tool and the option M1-2 of the eraser tool, the writing pen state 2 will be switched to the erasing function, and the secondary-level menu option of the option of the eraser tool is displayed in the middle region at the same time.

S602, in response to a continuous double-clicking operation from the user on the displayed option of the writing pen tool and the displayed option of the eraser tool, the erasing function of the writing pen is canceled and the writing pen function is recovered, and displaying of the secondary-level menu option of the option of the writing pen tool is recovered in the middle region; where the secondary-level menu option includes an adjusting option of a writing pen trajectory thickness. When the user continuously double-clicks the option M1-4 of the writing pen state 2 and the option M1-2 of the eraser, the writing pen state 2 will relieve the erasing function and recover the writing function, and displaying of the secondary-level menu option of the writing pen option is recovered in the middle region at the same time.

Figure 14:
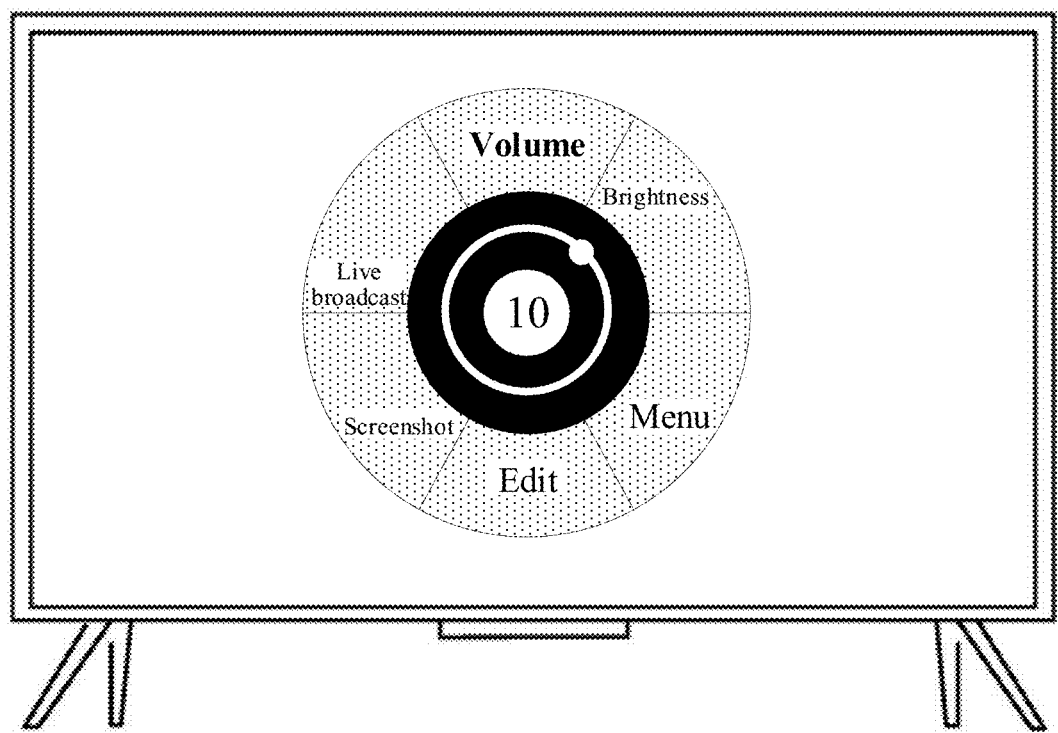
FIG. 14 is a schematic diagram of a tool tray menu in an electronic interactive tablet provided by an embodiment of the present disclosure.

In some embodiments, the tool tray menu further includes adjustment controls at least arranged in the middle region. Referring to FIG. 14, an outermost annular region includes volume, brightness, menu, edit, screenshot, and live broadcast. For example, in response to a user's touch operation on an adjustment control of the volume, a value of the volume and a progress bar of the volume are displayed in the middle region.

In other embodiments, the tool tray menu further includes adjustment controls arranged in the middle region and adjustment controls arranged in the second annular region; adjustment controls arranged in the middle region are configured to display secondary-level menu options of the first-level menu options; and adjustment controls arranged in the second annular region are configured to display an attribute progress bar or an attribute parameter adjusting icon matched with the displayed secondary-level menu option.

Figure 15:
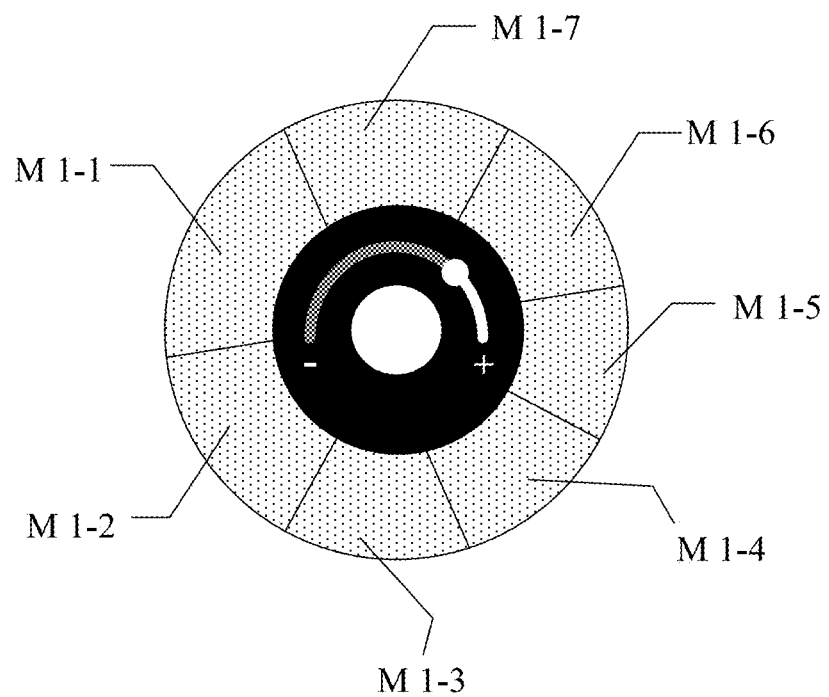
FIG. 15 is a schematic diagram of another tool tray menu in an electronic interactive tablet provided by an embodiment of the present disclosure.

In some embodiments, in the menu display method provided by the embodiments of the present application, an application of electronic interactive tablet further comprises a partition operation mode or multi-user writing mode. As shown in FIG. 15, the types of the plurality of first-level menu options on the writing configuration menu of the writing application on the touch display screen further comprise an option M1-7 of the partition operation mode or an option M1-7 of the multi-user writing mode. The partition operation mode is an operation mode in which a user can write in different partitions of the touch display screen, and the multi-user writing mode is a mode in which multiple users can write at different positions of the touch display screen at the same time.

In some embodiments, in the partition operation mode, only one writing configuration menu or floating button is displayed on touch display screen, and the partition operation mode corresponds to at least two partitions. Different partitions are configured to adopt different writing parameters for writing operations, or, different partitions are configured to adopt the same writing parameter for writing operations.

In some embodiments, a secondary-level menu option of the partition operation mode comprises: a manual partition mode, a two-partition mode, a three-partition mode, a four-partition mode and the like. Exemplarily, the two-partition mode includes: a left and right partition mode, and an upper and lower partition mode; the three-partition mode includes a partition mode of one row and three columns, and a partition mode of one column and three rows; the four-partition mode includes a partition mode of two rows and two columns, a partition mode of one row and four columns, and a partition mode of one column and four rows. Of course, it may also be other partition modes, which are not limited in the application. The manual partition mode is a mode in which the user can manually divide the region on the touch display screen, and the shape and size of the divided region are not limited in the application.

In some embodiments, the position of the floating button on the touch display screen can be changed.

In some embodiments, the writing configuration menu is configured to adjust the writing parameters, and the writing parameters at least include a type of the writing pen (for example, a writing brush), and the color and thickness of the writing trajectory of the writing pen. For example, the writing configuration menu is configured to adjust the type of the writing pen, and the color and thickness of the writing trajectory of the writing pen, etc.

Figure 16:
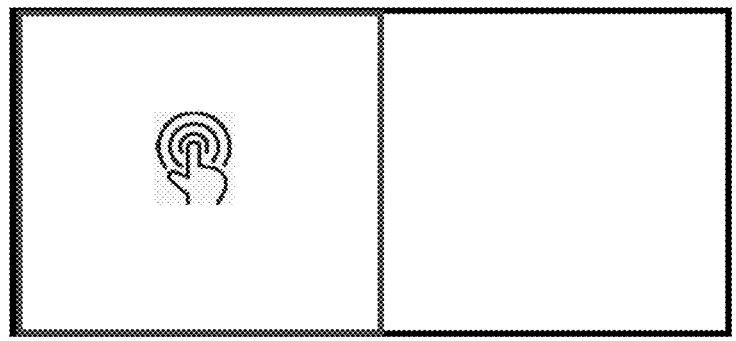
FIG. 16 is a position relationship between the writing area in which the user is currently writing and the full screen of the touch display screen in an electronic interactive tablet provided by an embodiment of the present disclosure.

In some embodiments, a partition controlled by the floating button or the writing configuration menu is determined according to a position where the floating button or writing configuration menu is triggered. Taking the left and right partition mode as an example, when the floating button is moved from the right to the left or the floating button is displayed on the left by a trigger mode, the floating button is further clicked, and then the writing configuration menu is displayed on the left of the touch display screen; where the writing configuration menu displayed on the left controls the writing parameters on the left of the touch display screen. When the user clicks the option M1-7 of the partition operation mode of the writing configuration menu displayed on the left, a schematic diagram of a position relationship between the writing area in which the user is currently writing and the full screen of the touch display screen is displayed in the middle area M2, as shown in FIG. 16. As can be seen from FIG. 16, the user is writing in the left area of the touch display screen. The writing parameters configured when the user is writing on the left are stored separately from those configured when the user is writing on the right.

Figure 17:
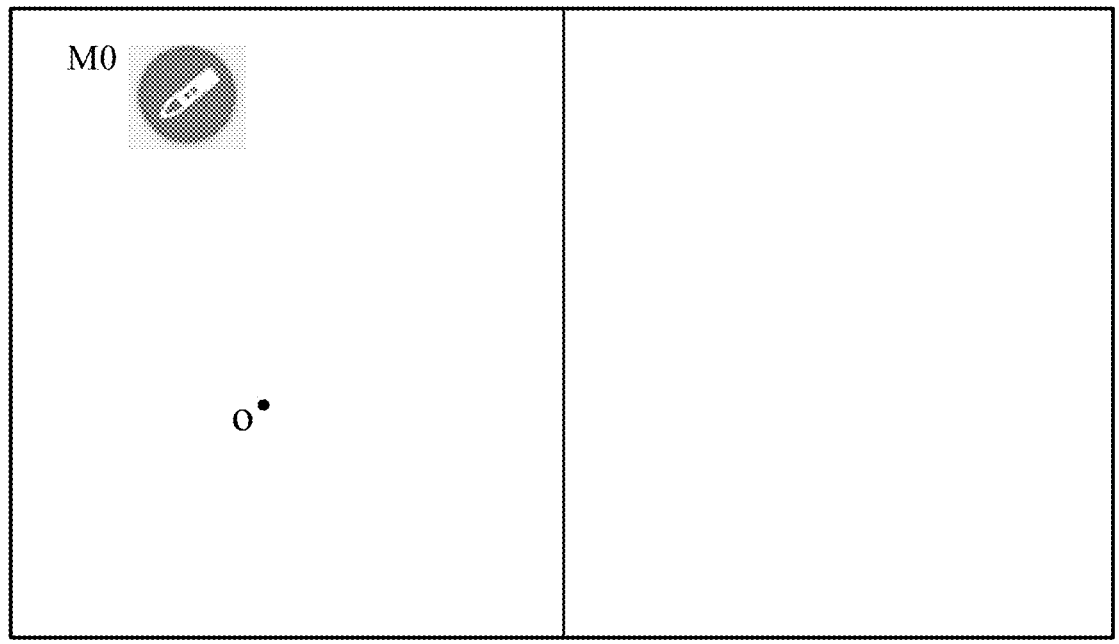
FIG. 17 is a schematic diagram of a corresponding relationship between the position of the floating button when triggered and the partition controlled by the floating button in an electronic interactive tablet provided by an embodiment of the present disclosure.

In some embodiments, taking the left and right partition mode as an example, FIG. 17 is a schematic diagram of a corresponding relationship between the position of the floating button when triggered and the partition controlled by the floating button. When the floating button M0 is triggered in the left area of the touch display screen, the floating button M0 controls writing parameters of the left area, i.e., an area where the position O is located. In other embodiments, as long as the writing configuration menu displayed after the floating button is triggered is located in the left area, even if the floating button before triggered is located in the right area, the writing configuration menu can control the writing parameters of the left area, that is, the area that the writing configuration menu controls is determined according to the position of the writing configuration menu displayed after the floating button is triggered.

In some embodiments, the following three ways may be adopted to trigger the partition operation mode: in the first way, the partition operation mode is started in response to a long-pressing operation on the floating button by the user; in the second way, in response to a preset trigger instruction on the touch display screen from the user, for example, five fingers clicking the touch display screen at the same time, to start the partition operation mode and start the writing configuration menu at the same time; in the third way, the partition operation mode is started by clicking the option M1-7 of partition operation mode of the write configuration menu.

In some embodiments, in the above first way, a selection box is generated in response to a long-pressing operation on the floating button by the user, where the selection box includes a manual partition mode, a two-partition mode, a three-partition mode, a four-partition mode, etc. When the user selects the four-partition mode, the four-partition operation mode is started.

In some embodiments, different partition modes are switched in response to a continuous selection on the secondary-level menu option of the partition operation mode from the user.

In other embodiments, in the multi-user writing mode, at least two writing configuration menus or floating buttons are displayed on the touch display screen, and a secondary-level menu option of the multi-user writing mode includes the number of writing configuration menus or floating buttons.

Exemplarily, the following three ways may be adopted to trigger the multi-user writing mode: in the first way, the multi-user writing mode is started in response to a long-pressing operation on the floating button by the user; for example, a selection box is generated in response to a long-pressing operation on the floating button by the user, and the user may select a mode in which two user can write at the same time, or a mode in which three user can write at the same time, or a mode in which four user can write at the same time, etc.; in the second way, in response to a preset trigger instruction on the touch display screen from the user, for example, five fingers clicking the touch display screen at the same time, to start the multi-user writing mode and start the writing configuration menu at the same time; in the third way, the multi-user writing mode is started by clicking the option M1-7 of multi-user writing mode of the write configuration menu.

In some embodiments, when the two-user writing mode is started, two writing configuration menus or two floating buttons are displayed on the touch display screen; when the three-user writing mode is started, three writing configuration menus or three floating buttons are displayed on the touch display screen; when the four-user writing mode is started, four writing configuration menus or four floating buttons are displayed on the touch display screen. Exemplarily, multiple writing configuration menus or floating buttons are displayed from left to right on the touch display screen. Each user can choose to display the writing configuration menu or hide the writing configuration menu, that is, display the floating button.

In some embodiments, a writing configuration menu (or floating button) that controls a writing parameter of a writing operation is determined according to a distance between a touch point of the writing operation and the at least two writing configuration menus (or at least two floating buttons). Exemplarily, in response to a writing operation from the user at any position on the touch display screen, the writing configuration menu or floating button closest to the any position controls the writing parameters at the any position, that is, the writing configuration menu or floating button closest to the touch point triggered by the user during writing may control the writing parameters at the touch point.

Figure 18:
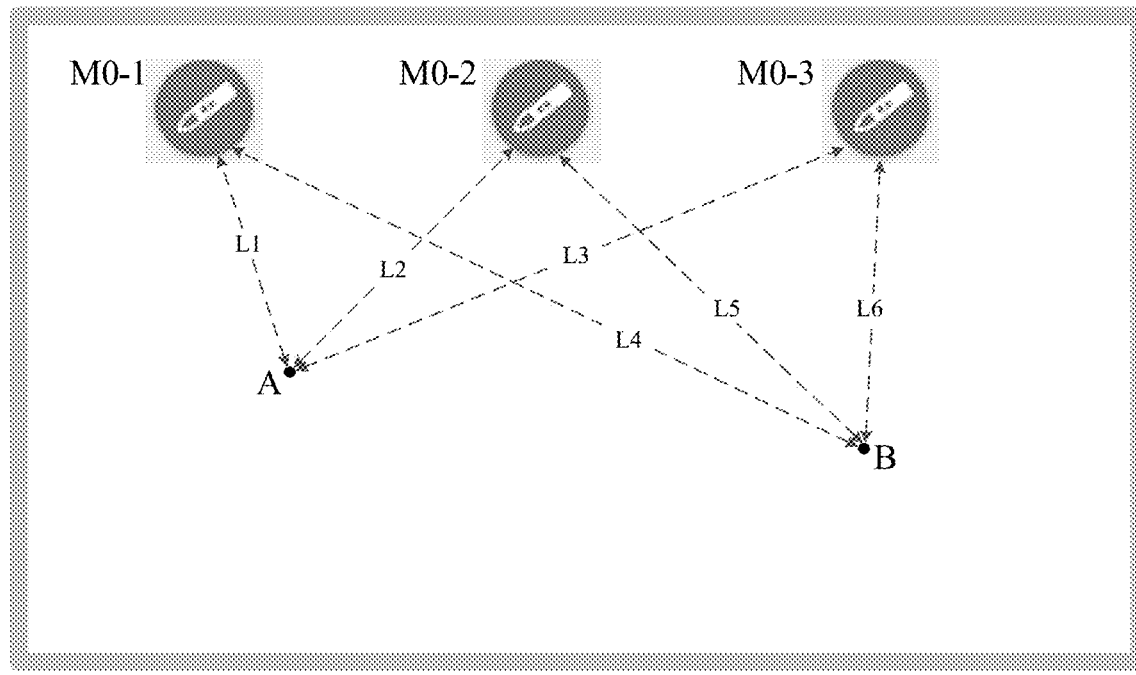
FIG. 18 is a schematic diagram of a distance relationship between the positions of writing operations performed by different users and floating buttons on the touch display screen in an electronic interactive tablet provided by an embodiment of the present disclosure.

FIG. 18 is a schematic diagram of a distance relationship between the positions of writing operations performed by different users and floating buttons on the touch display screen. As shown in FIG. 18, three floating buttons are displayed on the touch display screen. When a writing pen tool is detected at the position A, that is, when a first user writes at the position A, the floating button M0-1 closest to the position A controls a width of a trajectory, transparency of the trajectory and a color of the trajectory when writing at position A. When a handwriting tool is detected at the position B, that is, when a second user writes at the position B, the floating button M0-3 closest to the position B controls a width of a trajectory, transparency of the trajectory and a color of the trajectory when writing at the position B. The position of a writing operation performed by a third user on the touch display screen is not shown in FIG. 18. Each floating button or writing configuration menu has been configured with writing parameters before writing. For example, before writing, the writing parameters of floating button M0-1 or its corresponding writing configuration menu are configured as writing brush, black, and a thick of 1 cm. When the user starts to write, the writing position (such as the position where the writing brush touches the touch display screen) of the user is closest to the floating button M0-1, and the writing parameters configured in the floating button M0-1 may be automatically assigned to the currently writing operation of the user. About the above, other floating buttons or writing configuration menus are similar to the floating button M0-1, and will not be described in detail. Different writing configuration menus can be configured with the same or different writing parameters; and each writing configuration menu separately controls the writing parameters of the corresponding area.

In some embodiments, the writing area controlled by the writing configuration menu (or the floating button) can be determined according to the horizontal distance between any two writing configuration menus (or any two floating buttons), that is, only the horizontal distance is considered. For example, a perpendicular bisector of the connection line between any two writing configuration menus (or any two floating buttons) serves as a dividing line of the writing areas controlled by any two writing configuration menus (or any two floating buttons).

Figure 19:
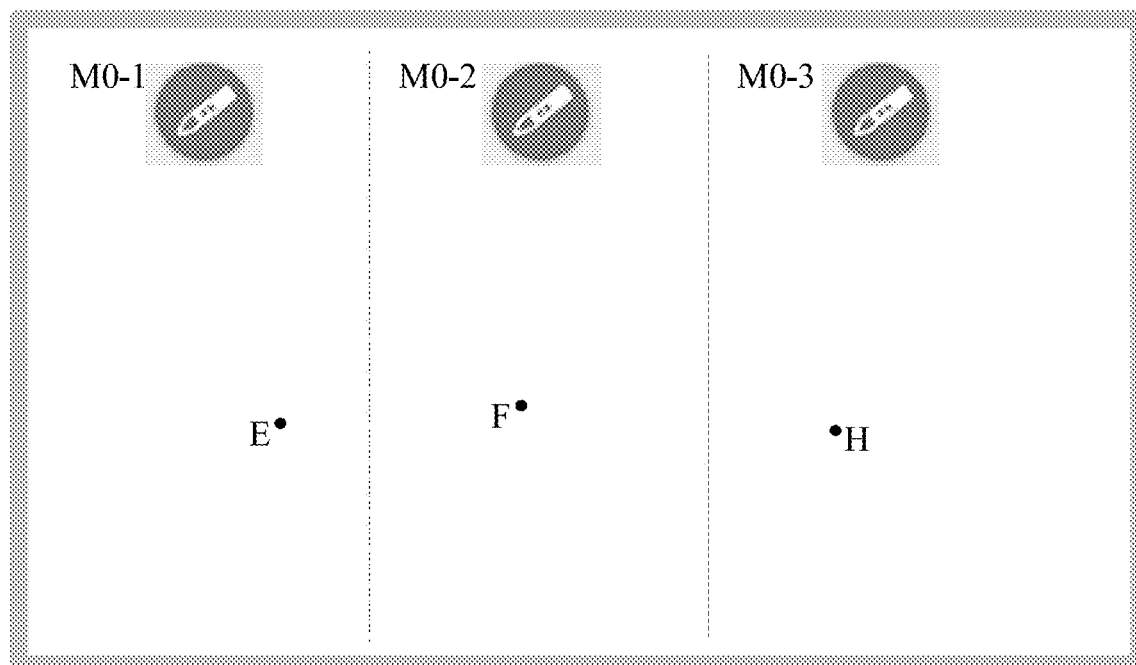
FIG. 19 is a schematic diagram of a corresponding relationship between the positions of writing operations performed by different users and floating buttons on the touch display screen in an electronic interactive tablet provided by an embodiment of the present disclosure.

FIG. 19 is a schematic diagram of a corresponding relationship between the positions of writing operations performed by different users and floating buttons on the touch display screen. As shown in FIG. 19, three floating buttons are displayed on the touch display screen, and there is a perpendicular bisector between any two floating buttons, that is, the dotted lines shown in the figure. When an eraser tool is detected at the position E, that is, when a first user writes at the position E, the floating button M0-1 controls the erasing area, erasing shape and the like of the corresponding eraser tool when writing at the position E. When the writing pen tool is detected at the position F, that is, when a second user writes at the position F, the floating button M0-2 controls a width of a trajectory, transparency of the trajectory and a color of the trajectory when writing at the position F. When the handwriting tool is detected at the position H, that is, when a third user writes at the position H, the floating button M0-3 controls a width of a trajectory, transparency of the trajectory and a color of the trajectory when writing at the position H.

In some embodiments, when the partition operation mode is started, the writing parameters configured when not partitioned are saved; and when the partition operation mode is closed, the writing parameters configured when not partitioned are automatically restored. In some embodiments, when the multi-user writing mode is started, the writing parameters configured for the single-user writing mode are saved; and when the multi-user writing mode is closed, the writing parameters configured for the single-user writing mode are automatically restored.

Based on the same application concept, an embodiment of the present disclosure further provides a control method of writing tool attribute, as shown in FIG. 20, including the following.

S141, a writing tool bar is displayed on a writing application, where the writing tool bar includes one or more writing tool icons; the one or more writing tool icons include at least one of an icon of a handwriting tool, an icon of a writing pen tool or an icon of an eraser tool; and the writing tool bar has an annular region.

S142, in response to an operation from a user along the annular region, an attribute of a selected writing tool is changed, where the attribute of the writing tool includes at least one of a trajectory thickness, trajectory transparency, a trajectory color, an erasing area or an erasing shape.

In some implementations, the control method provided by the embodiment of the present disclosure specifically includes the following: when the selected writing tool is the eraser tool, as shown in FIG. 21A and FIG. 21B, in response to a sliding or clicking operation from the user along the annular region, the size of the erasing area of the eraser tool is enlarged or reduced to erase writing contents in the writing application according to the enlarged or reduced eraser tool. For example, state change of the annular region shown from FIG. 21A to FIG. 21B corresponds to reducing of the erasing area of the eraser tool, and state change of the annular region shown from FIG. 21B to FIG. 21A corresponds to enlarging of the erasing area of the eraser tool.

When the selected writing tool is the handwriting tool or the writing pen tool, in response to a sliding or clicking operation from the user along the annular region, a width of a trajectory is increased or gradually decreased to write according to the adjusted width of the trajectory; or, in response to the sliding or clicking operation from the user along the annular region, the trajectory transparency is enhanced or weakened to write according to the adjusted trajectory transparency; or, in response to the sliding or clicking operation from the user along the annular region, the trajectory color is changed for writing according to the adjusted trajectory color.

Based on the same application concept, an embodiment of the present disclosure further provides an electronic interactive tablet. Since the problem solving principle of the electronic interactive tablet is similar to those of the menu display method of the electronic interactive tablet and the control method of the writing tool attribute, the implementation of the electronic interactive tablet can refer to the implementation of the methods, and repetitions are omitted.

The electronic interactive tablet provided by the embodiment of the present disclosure, as shown in FIG. 22, includes: a touch display panel 1 and a processor 2. The processor 2 is configured to execute the menu display method of the electronic interactive tablet provided by the embodiments of the present disclosure, or execute the control method of the writing tool attribute provided by the embodiments of the present disclosure.

Based on the same application concept, embodiments of the present disclosure further provide an electronic interactive system. Since the problem solving principle of the electronic interactive system is similar to that of the menu display method of the electronic interactive tablet, the implementation of the electronic interactive system can refer to the implementation of the method, and repetitions are omitted.

The electronic interactive system provided by the embodiment of the present disclosure includes:

an electronic interactive tablet, including: a first writing module supporting hand writing, a second writing module supporting a writing pen, a memory and one or more processors. The memory is configured to store one or more programs. When executed by the one or more processors, the one or more programs cause the one or more processors to implement the menu display method of the electronic interactive tablet or the control method of the writing tool attribute provided by the embodiments of the present disclosure; and the writing pen, where a pen body of the writing pen includes at least two switching buttons.

Based on the same application concept, an embodiment of the present disclosure further provides a storage medium containing computer-executable instructions. When executed by a computer processor, the computer-executable instructions are used to execute the menu display method of the electronic interactive tablet provided by the embodiment of the present disclosure.

Based on the same application concept, an embodiment of the present disclosure further provides a non-volatile storage medium containing computer-executable instructions. When executed by a computer processor, the computer-executable instructions are used to execute the control method of the writing tool attribute provided by the embodiment of the present disclosure.

The present application further discloses a following embodiment. An electronic interactive tablet includes a touch display screen and a processor;

the processor is configured to display a first control icon on the touch display screen, where the first control icon is a first control icon of a writing tool; and the processor is configured to receive an operation from a user on the first control icon displayed on the touch display screen, and switch the first control icon to display a second control icon. The first control icon and the second control icon are control icons of different types of writing tools.

In some implementations, the first control icon and the second control icon are control icons of the different writing tools corresponding to the same type of writing tools, and the same type of writing tools are one of a writing pen, an eraser and a geometric figure for drawing; and when the writing pen tool is started, writing on the touch display screen is performed through a finger or a pen.

In the embodiment and all embodiments below, a writing pen icon is only configured to distinguish functions such as the eraser and not intended to limit pen writing or handwriting; and a writing color, a writing trajectory width and writing trajectory transparency may also be set according to the embodiments above even for handwriting.

Exemplarily, when the same type of writing tools are writing pens, the first control icon and the second control icon of the different writing tools are writing pen icons identifying the different writing pens.

Exemplarily, when the same type of writing tools is the eraser, the icons are eraser icons identifying different erasing areas of the eraser.

Exemplarily, when the same type of writing tools are geometric figures for drawing, the icons are geometric icons for drawing identifying different geometric shapes.

In some embodiments, the processor is further configured to display one or more third control icons on the touch display screen. The one or more third control icons at least include one or more writing pen icons, eraser icons, and switching icons of writing and gesture recognition function; and the processor is configured to display the first control icon or the second control icon in response to a selecting operation from the user on one of the plurality of third control icons.

In some embodiments, each of the third control icons is an arc icon, the plurality of third control icons are sequentially arranged end to end to form a ring shape, the first control icon and the second control icon are circular or annular, the first control icon or the second control icon is located in the ring-shaped icons, and the third control icons have no overlapping with the first control icon or the second control icon in positions on the touch display screen.

In some embodiments, the processor is configured to display a parameter control icon between the first control icon or the second control icon and the third control icons; the parameter control icon is a progress bar;

the parameter control icon is a color parameter control icon, a writing trajectory transparency control icon or a writing trajectory width control icon corresponding to the writing pen; or the parameter control icon is an eraser size control icon corresponding to an erasing area of the eraser; and the processor is configured to change a writing color parameter of the writing pen when receiving an operation from the user on the color parameter control icon, or change a transparency parameter of a writing trajectory of the writing pen on the touch display screen when receiving an operation on the writing trajectory transparency control icon, or change a width parameter of the writing trajectory on the touch display screen when receiving an operation on the writing trajectory width control icon.

The present application further discloses a following embodiment. An electronic interactive tablet includes a touch display screen and a processor;

the processor is configured to display a first control icon on the touch display screen, where the first control icon is a first control icon of a writing tool;

the processor is configured to receive an operation from a user on the first control icon displayed on the touch display screen, and switch the first control icon to display a second control icon; and the first control icon and the second control icon are control icons of different writing tools corresponding to the same type of writing tools; and the processor is configured to receive an operation from the user on the writing pen icon of one writing pen on the touch display screen and switch to display the writing pen icon of another writing pen; or receive an operation from the user on the eraser icon corresponding to a first erasing area displayed on the touch display screen and switch to display the eraser icon corresponding to a second erasing area; or receive an operation from the user on the geometric icon for drawing of one of the geometric shapes displayed on the touch display screen and switch to display the geometric icon for drawing of another geometric shape.

In the embodiment above, the first control icon and the second control icon are the control icons of the different types of writing tools, and the different types of writing tools are two of a writing pen, an eraser, a geometric figure for drawing, and a switching icon of writing and gesture recognition function; and the processor is configured to receive operations from the user on a writing pen icon, an eraser icon, the switching icon of writing and gesture recognition function or a geometric icon for drawing displayed on the touch display screen, and switch to display the writing pen icon, the eraser icon, the switching icon of writing and gesture recognition function or the geometric icon for drawing, where the icons before and after switching are different icons.

In some implementations, the present application further discloses a following embodiment. An electronic interactive tablet includes a touch display screen and a processor. The processor is configured to display a first control icon on the touch display screen, where the first control icon is a first control icon of a writing tool.

The processor is configured to receive an operation from a user on the first control icon displayed on the touch display screen, and switch the first control icon to display a second control icon. The first control icon and the second control icon are control icons of different writing tools corresponding to the same type of writing tools, or, the first control icon and the second control icon are control icons of different types of writing tools.

The processor is configured to display a parameter control icon on the currently displayed first control icon or second control icon, or display the parameter control icon in a region surrounding the currently displayed first control icon or second control icon. The parameter control icon is a writing attribute parameter control icon.

The processor is configured to change variation of a certain writing attribute parameter of the writing tool corresponding to the first control icon or the second control icon after receiving change of a position of the parameter control icon on the touch display screen by the user.

In the embodiment above, the first control icon and the second control icon are control icons with regular figures, the parameter control icon is a progress bar control icon or a point-like control icon, and the processor is configured to change variation of a certain writing attribute parameter of the writing tool corresponding to the first control icon or the second control icon when receiving, from the user, a dragging operation on the progress bar control icon, or dragging of the point-like control icon on a preset moving trajectory, or a clicking operation on the preset moving trajectory of the point-like control icon.

In the embodiment above, the first control icon or the second control icon corresponding to the writing tool is one of a writing pen, an eraser and a geometric figure for drawing; the parameter control icon is a color parameter control icon, a writing trajectory transparency control icon or a writing trajectory width control icon corresponding to the writing pen; or the parameter control icon is an eraser size control icon corresponding to an erasing area of the eraser; and the processor is configured to change a writing color parameter of the writing pen when receiving an operation from the user on the color parameter control icon, or change a transparency parameter of a writing trajectory of the writing pen on the touch display screen when receiving an operation on the writing trajectory transparency control icon, or change a width parameter of the writing trajectory on the touch display screen when receiving an operation on the writing trajectory width control icon.

The present application further discloses a following embodiment. An electronic interactive tablet includes a touch display screen and a processor;

the processor is configured to display a writing tool control icon on the touch display screen; and the writing tool control icon includes a first control icon and a second control icon;

the first control icon and the second control icon are two of a writing color parameter control icon, a writing trajectory transparency control icon and a writing trajectory width control icon; and the second control icon is an annular progress bar control icon, and the first control icon is located in a region surrounded by the second control icon.

In some embodiments, the writing tool control icon further includes a third control icon; and the third control icon is circular or elliptical and is located in a region surrounded by the first control icon; and the processor is configured to switch a display content of the first control icon in response to a selecting operation from a user on the third control icon; where a display content of the second control icon is one of the color parameter control icon, the writing trajectory transparency control icon and the writing trajectory width control icon, and the one of the icons is an icon that is not currently displayed on the first control icon and the second control icon.

In some embodiments, the writing tool control icon further includes a third control icon. The third control icon is annular and is located in the region surrounded by the first control icon. The third control icon is one of the color parameter control icon, the writing trajectory transparency control icon and the writing trajectory width control icon; the first control icon, the second control icon and the third control icon respectively display one of the color parameter control icon, the writing trajectory transparency control icon and the writing trajectory width control icon; and the first control icon, the second control icon and the third control icon display different parameter control icons.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including but not limited to a disk memory, a CD-ROM, an optical memory and the like) containing computer available program codes.

The present disclosure is described with reference to the flow diagrams and/or block diagrams of the method, apparatus (system), and computer program product according to the present disclosure. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

Apparently, those skilled in the art can make various modifications and variations to the present disclosure without departing from the spirit and scope of the present disclosure. In this way, under the condition that these modifications and variations of the present disclosure fall within the scope of the claims of the present disclosure and their equivalent technologies, the present disclosure is also intended to include these modifications and variations.

What is claimed is:

1. A menu display method of an electronic interactive tablet, wherein the electronic interactive tablet comprises a touch display screen, and the menu display method comprises:
    displaying a tool tray menu of an application displayed on the touch display screen, wherein the tool tray menu comprises a plurality of first-level menu options which are in one-to-one correspondence with a plurality of tools;
    wherein the tool tray menu has a regular shape, and the regular shape comprises a middle region and at least one annular region surrounding the middle region;
    the at least one annular region comprises a plurality of block-shaped sub-regions; and
    each of the plurality of block-shaped sub-regions displays one of the plurality of first-level menu options correspondingly;
    wherein the tool tray menu further comprises adjustment controls at least arranged in the middle region;
    wherein an outermost annular region is a first annular region, and the first annular region displays the plurality of first-level menu options;
    wherein the adjustment controls arranged in the middle region is configured to display secondary-level menu options of the plurality of first-level menu options;
    wherein the method further comprises: in response to a calling operation from a user on the tool tray menu of the application on the touch display screen, displaying the plurality of first-level menu options in the first annular region, starting a selected function of one of the plurality of first-level menu options, and simultaneously displaying a secondary-level menu option of the started first-level menu option in the middle region; or
    in response to a selecting operation from the user on one of the plurality of first-level menu options, displaying a secondary-level menu option of the selected first-level menu option in the middle region;
    wherein at least one of the plurality of tools comprises one or more attributes; and
    a secondary-level menu option of the first-level menu option corresponding to one of the plurality of tools is configured to display the one or more attributes;
    wherein the application displayed on the touch display screen further comprises a multi-user writing mode; and in the multi-user writing mode, at least two writing configuration menus are displayed on the touch display screen;
    wherein the method further comprises: determining a writing configuration menu that controls a writing parameter of a writing operation according to a distance between a touch point of the writing operation and the at least two writing configuration menus;
    wherein the types of the plurality of first-level menu options further comprise an option of the multi-user writing mode;
    wherein a secondary-level menu option of the multi-user writing mode comprises: the number of writing configuration menus.

2. The menu display method according to claim 1, further comprising:
    in response to a sliding operation from the user on the first annular region, controlling the plurality of first-level menu options that have been displayed to move along a sliding direction, newly displaying at least one first-level menu option in the first annular region, and concealing at least one of the plurality of first-level menu options that has been displayed simultaneously;
    wherein a sliding direction of the sliding operation corresponds to an annular extending direction of the first annular region.

3. The menu display method according to claim 2, further comprising:
    in response to a touch operation from the user on one first-level menu option in the first annular region, controlling the first annular region to newly display one first-level menu option, and simultaneously concealed or deleted the one first-level menu option subjected to the touch operation;

wherein the touch operation is a deleting operation or a concealing operation; and the deleting operation or the concealing operation comprises: an outward sliding operation relative to the middle region, or a continuous clicking operation.

4. The menu display method according to claim 1, wherein when the secondary-level menu option is configured to display the more attributes, the method further comprises: in response to an operation from the user on a currently displayed attribute of the secondary-level menu option, switching the current attribute and displaying the switched attribute.

5. The menu display method according to claim 4, wherein the tool tray menu is a writing configuration menu;

wherein types of the plurality of first-level menu options comprise one or more of an option of a handwriting tool, an option of a writing pen tool, an option of an eraser tool, an option of a file inserting tool, an option of a canvas dragging tool, an option of a revocation function and an option of a recovery function; and one or more attributes of the writing pen tool comprises at least one of a width of a trajectory, transparency of the trajectory or a color of the trajectory; one or more attributes of the handwriting tool comprise at least one of a width of a trajectory, transparency of the trajectory or a color of the trajectory; and one or more attributes of the eraser tool comprise at least one of an erasing area of an eraser or an erasing shape of the eraser.

6. The menu display method according to claim 5, wherein the application displayed on the touch display screen further comprises a partition operation mode;

wherein the method further comprises: determining a partition controlled by a floating button or the writing configuration menu according to a position where the floating button or writing configuration menu is triggered.

7. The menu display method according to claim 6, wherein in the partition operation mode, one writing configuration menu and at least two partitions are displayed on the touch display screen;

different partitions are configured to adopt same or different writing parameters for writing operations; and the writing configuration menu is configured to adjust the writing parameters.

8. The menu display method according to claim 7, wherein the types of the plurality of first-level menu options further comprise an option of the partition operation mode; and a secondary-level menu option of the partition operation mode comprises: a two-partition mode, a three-partition mode, a four-partition mode, and a manual partition mode;

wherein the method further comprises: switching different partition modes in response to a continuous selection on the secondary-level menu option of the partition operation mode from the user.

9. The menu display method according to claim 4, wherein an annular region adjacent to the middle region is a second annular region;

the tool tray menu further comprises adjustment controls arranged in the second annular region; and the adjustment controls arranged in the second annular region are configured to display an attribute progress bar or an attribute parameter adjusting icon matched with the displayed secondary-level menu option.

10. The menu display method according to claim 9, wherein the method further comprises:

in response to a sliding or clicking operation from the user along the attribute progress bar corresponding to the erasing area of the eraser tool, enlarging or reducing a size of the erasing area of the eraser tool; and/or, in response to a sliding or clicking operation from the user along the attribute progress bar corresponding to a width of a writing trajectory of the writing pen tool or the handwriting tool, increasing or decreasing the width of the writing trajectory; and/or, in response to a sliding or clicking operation from the user along the attribute progress bar corresponding to the transparency of the trajectory of the writing pen tool or the handwriting tool, increasing or decreasing the transparency of a writing trajectory; and/or, in response to a sliding or clicking operation from the user along the attribute progress bar corresponding to the color of the trajectory of the writing pen tool or the handwriting tool, changing the color of a writing trajectory;

or in response to an operation from the user on the attribute parameter adjusting icon, enlarging or reducing the size of the erasing area of the eraser tool, or increasing or decreasing the width of the writing trajectory, or increasing or decreasing the transparency of the writing trajectory, or changing the color of the writing trajectory.

11. The menu display method according to claim 10, further comprising:

detecting a contact area of touch when the user operates the touch display screen; and when determining that the contact area is greater than a set value, increasing an area of the displayed tool tray menu.

12. The menu display method according to claim 1, further comprising: displaying a floating button of the application on the touch display screen;

wherein the floating button is a button for the tool tray menu in a folded state;

a region occupied by the tool tray menu on the touch display screen is larger than a region occupied by the floating button; and when displayed on the touch display screen, the application comprises four sides corresponding to a periphery of the touch display screen;

wherein the method further comprises: in response to a calling operation from a user on an application navigation bar on one of the four sides of the application, displaying the floating button on one side of the called application navigation bar.

13. The menu display method according to claim 12, further comprising:

in response to a calling operation from the user on the tool tray menu of the application on the touch display screen, displaying the plurality of first-level menu options in a first annular region, wherein the calling operation from the user on the tool tray menu of the application on the touch display screen is a selecting operation on the floating button displayed by the application;

in response to the selecting operation from the user on the floating button displayed by the application, not displaying the floating button but displaying the tool tray menu on the touch display screen; and in response to a selecting operation from the user on a position other than the tool tray menu displayed by the application on the touch display screen, not displaying the tool tray menu but displaying the floating button on the touch display screen.

14. The menu display method according to claim 13, wherein not displaying the floating button but displaying the tool tray menu on the touch display screen, comprises:

determining whether a relation between a position where the floating button is arranged and a display edge of the application meets a condition for completely displaying the tool tray menu;

if yes, displaying the tool tray menu with the position where the floating button is arranged as a center point of the tool tray menu to be displayed; and if not, determining a center point of the tool tray menu to be displayed to completely display the tool tray menu;

wherein not displaying the tool tray menu but displaying the floating button on the touch display screen, comprises: recovering displaying of the floating button with a position where the tool tray menu is arranged as a center.

15. The menu display method according to claim 1, further comprising: determining an area controlled by each of the at least two writing configuration menus according to a horizontal distance between any two of the at least two writing configuration menus;

wherein different writing configuration menus are configured with same or different writing parameters; and each of the at least two writing configuration menus separately controls a writing parameter of a corresponding area.

16. An electronic interactive tablet, comprising a touch display screen and a processor, wherein:

the processor is configured to execute the menu display method of the electronic interactive tablet according to claim 1.

* * * * *